US008396958B1

(12) United States Patent
Hilferty

(10) Patent No.: US 8,396,958 B1
(45) Date of Patent: Mar. 12, 2013

(54) COMPUTER-AUTOMATED LOGBOOK OF CONDITION-BASED DATA FOR MACHINERY MANAGEMENT

(75) Inventor: Edward L. Hilferty, Glenolden, PA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1864 days.

(21) Appl. No.: 10/729,268

(22) Filed: Dec. 2, 2003

Related U.S. Application Data

(60) Provisional application No. 60/434,598, filed on Dec. 18, 2002.

(51) Int. Cl.
*G06F 15/173* (2006.01)
(52) U.S. Cl. .................. 709/224; 709/217; 709/219
(58) Field of Classification Search ............... 700/17, 700/19–21, 26–27, 31, 108, 109, 110, 111; 707/1–10; 709/219, 224, 227–231, 236–237
See application file for complete search history.

(56) References Cited

U.S. PATENT DOCUMENTS

| | | | | |
|---|---|---|---|---|
| 6,016,204 | A * | 1/2000 | Budnik et al. | 358/1.14 |
| 6,182,047 | B1 | 1/2001 | Dirbas | |
| 6,363,388 | B1 | 3/2002 | Sprenger et al. | |
| 6,366,890 | B1 | 4/2002 | Usrey | |
| 6,377,993 | B1 | 4/2002 | Brandt et al. | |
| 6,434,502 | B1 * | 8/2002 | Harrison | 702/122 |
| 6,438,547 | B1 | 8/2002 | Mehr et al. | |
| 6,464,133 | B1 | 10/2002 | Gruber | |
| 6,751,622 | B1 * | 6/2004 | Puri et al. | 1/1 |
| 6,772,033 | B2 * | 8/2004 | Scherer et al. | 700/115 |
| 6,820,095 | B1 * | 11/2004 | Yeung et al. | 707/642 |
| 7,020,701 | B1 * | 3/2006 | Gelvin et al. | 709/224 |
| 2001/0047279 | A1 * | 11/2001 | Gargone | 705/1 |
| 2002/0007229 | A1 * | 1/2002 | Hudson et al. | 700/245 |
| 2002/0054101 | A1 * | 5/2002 | Beatty | 345/764 |
| 2003/0009536 | A1 * | 1/2003 | Henderson et al. | 709/219 |
| 2003/0023518 | A1 * | 1/2003 | Spriggs et al. | 705/28 |
| 2003/0023611 | A1 * | 1/2003 | Benjamin et al. | 707/101 |
| 2003/0061330 | A1 * | 3/2003 | Frisco et al. | 709/223 |
| 2003/0195790 | A1 * | 10/2003 | Wepfer et al. | 705/9 |

OTHER PUBLICATIONS

Patrick Blattner, "Special Edition Using Microsoft Excel 2002", Pub date: May 18, 2001, Que Corporation, (see printed pages).*
Hilferty, Edward L., "Autolog 2000 Revolutionizes the Maintenance of Gase Turbine Logbooks," *Wavelengths*, Naval Surface Warfare Center, Carderock Division, Dec. 1999, p. 31.
Hilferty, Edward L., "Condition Based Maintenance, Life Cycle Management, and Autolog," 11th International Conference on Computer Applications in Shipbuilding (ICCAS 2002), Malmoe, Sweden, Sep. 9-12, 2002, Chapter 0, pp. 1-9.

(Continued)

*Primary Examiner* — Kenny Lin
*Assistant Examiner* — Scott M Sciacca
(74) *Attorney, Agent, or Firm* — Howard Kaiser

(57) ABSTRACT

Multiple personal computers are each situated aboard its own ship and are each communicatively connected to an electronic depository of information for purposes of effecting real time management of engines and other shipboard machinery. Information is electronically communicated back and forth between each onboard computer and the electronic depository, such as via File Transfer Protocol (FTP), e-mail or compact disk (CD). The electronic depository takes information from all of the onboard computers, and each onboard computer records information including that which is entered therein by a user and that which derives from the electronic depository. Each onboard computer executes import and export routines for communicating with the electronic depository, and executes start-up routines for displaying user-interactive formal screens that are individually tailored for the user's input and viewing of particular types of information, such as involving maintenance, repair, logistics, inspection and/or operation of the machinery.

18 Claims, 36 Drawing Sheets

OTHER PUBLICATIONS

Hilferty, Edward L., *Marine Gas Turbine Information System Autolog User's Guide* (contains 133 pages), Department of the Navy, Naval Sea Systems Command (NAVSEA), Naval Surface Warfare Center Carderock Division (NSWCCD), Auxiliary Gas Turbine Branch, Code 935; available (in color) on the Internet in the U.S. Navy Marine Gas Turbines website, https://mgt.navsses,navy.mil/, at https://mgt.navsses.navy.mil/pdf/UGAutolog.pdf, 133 pages printed out (grayscale) on Dec. 3, 2004.

Hilferty, *Autolog Training Guide* (contains 99 pages), Department of the Navy, Naval Sea Systems Command (NAVSEA), Naval Surface Warfare Center Carderock Division (NSWCCD), Auxiliary Gas Turbine Branch, Code 935; available (in color) on the Internet in the U.S. Navy Marine Gas Turbines website, https://mgt.navsses.navy.mil/, at https://mgt.navsses.navy.mil/autotrain.pdf, 99 pages printed out (grayscale) on Dec. 3, 2004.

* cited by examiner

| | |
|---|---|
| IF USED("temp7")<br>    SELE temp7<br>    USE<br>ENDIF<br><br>IF FILE("temp7.dbf")<br>    DELETE FILE temp7.dbf<br>ENDIF | Checking if temporary file with the same name already exists and if so delete it. |
| SELECT * ;<br>FROM servrec ;<br>INTO TABLE temp7 ;<br>WHERE l_update > last_export and (mdel)<>'DEL' | Selecting all records from the servrec.dbf table (Service Records) which are not marked for deletion and which were updated after last export into the temporary table (temp7.dbf). |
| USE temp7<br>=Servrec_Header()<br>GO TOP | Calling procedure writes the Service Records header into export file. |

FIG. 2a

| | |
|---|---|
| SCAN<br>m.serv_rec = ALLTRIM(STR(temp7.serv_rec))<br>m.comp_recor = ALLTRIM(STR(temp7.comp_recor))<br>m.main_recor = ALLTRIM(STR(temp7.main_recor))<br>m.tan_record = ALLTRIM(STR(temp7.tan_record))<br>m.l_update = ALLTRIM(DTOC(temp7.l_update))<br>m.msn = ALLTRIM(temp7.msn)<br>m.asn = ALLTRIM(temp7.asn)<br>m.notes = ALLTRIM(temp7.notes)<br>m.dummy = ALLTRIM(temp7.dummy)<br>m.ycomp_instd = ALLTRIM(DTOC(temp7.ycomp_inst))<br>m.signature = ALLTRIM(temp7.signature)<br>m.hulltype = ALLTRIM(temp7.hulltype)<br>m.by = ALLTRIM(temp7.by)<br>m.ciasn = ALLTRIM(temp7.ciasn) | Going through records in a temporary file one by one converting it to a string where needed. |
| out_put = qbe+m.serv_rec+qm+qbe+m.comp_recor+qm+ ;<br>qbe+m.main_recor+qm+qbe+m.tan_record+qm+ ;<br>qbe+m.ycomp_instd+qm+qbe+m.signature+qm+qbe+ ;<br>   m.by+qm+qbe+m.notes+qm+qbe+m.ciasn+qm+qbe+;<br>m.l_update+qm+qbe+m.dummy+qbe | Assigning correct format value to out_put.<br><br>qbe = ''''<br>qm = ''',''- gets set in a beginning of the program |
|    =FPUTS(downloadfile,out_put)<br>ENDSCAN | Writes a character string (out_put), carriage return, and line feed to a file opened. |

FIG. 2b

| | Using current table from step (2) and obtain its structure in accordance with table structure reads delimited value as numeric(function readnum()) or character(function readchar()) functions readchar() and readnum() are also responsible for placing value read into appropriate cell |
|---|---|
| USE (CurrentTable)<br>=AFIELDS(structure)<br>rows = ALEN(structure,1)<br>APPEND BLANK<br>    FOR i = 1 TO rows<br><br>      IF structure[i,2] = "N"<br>        =readnum("",0)<br>      ELSE<br>        =readchar("",0)<br>      ENDIF<br>    ENDFOR<br>        ELSE<br>……<br>……<br>IF CurrentTable = "End"<br>exit<br>ENDIF<br>…… | If instead of the table name program reads "End" it exits |

| | |
|---|---|
| if iadding<br>... | variable iadding is set in the Engine/Module tabular section and has a boolean value true if the user is adding a new record and false if only modifying an existing record.<br><br>If the user is adding a record: |
|     sele inspect<br>    append blank<br>...<br>    repl inspect.ciasn with section.ciasn<br>    repl inspect.asn with section.asn<br>    repl inspect.msn with section.msn<br>... | A blank record is appended to the inspect table. That record is filled in with the engine information (the CIASN, ASN, and MSN) propagated from the Engine/Module the user is working on |
| ...<br>    repl inspect.mdel with "OK"<br>    repl ydt_comm with { / / }<br>    repl ydt_comp with { / / }<br>    repl tsn with 0<br>    repl nextdue with 0 | Replace columns which are controls for the form fields and set the pull-downs with their initial values. |
|     repl inspect.dummy with "A" | The dummy cell indicates whether a record was added or modified so that further programs know (such as import or export functions). |
| Else | In case of modification |
|     select inspect<br>      goto editrec<br>      if empty(inspect.dummy)<br>        repl inspect.dummy with "M"<br>      endif<br>endif | Variable editrec is already set by the Engine/Module tabular section It contains the value of the record number in inspect.dbf table to be modified. |
| replace inspect.l_update with date() | Update the record date. |

FIG. 8a

| Tabular section | Form | Required fields |
|---|---|---|
| SERVICE RECORD | servrec | Installation Date<br>By (Activity)<br>Verified By (Signature) |
| CUSTODY & TRANSFER | tranedit | Transfer Date<br>To (Location)<br>Authority<br>Verified By (Signature) |
| OPERATING LOG | enghoure | Date Recorded |
| | | Hours per Month, Starts per Month, Base line Hours, Base line Starts - *shouldn't be negative* |
| INSPECTION RECORD | inspedit | Inspection Type<br>Activity<br>Verified By (Signature)<br>Special Conditions |
| RECORD OF REWORK | rewedit | *none* |
| TECHNICAL DIRECTIVES | ectdedit | installation date<br>TD No<br>Title<br>Activity<br>Verified By (Signature)<br>Type<br>Status |
| MISCELLANEOUS HISTORY | histedit | Title of Reference |
| SELECTED COMPONENT RECORD | compedit2 | Installation Date<br>Nomenclature<br>*If user enters Date Removed then:*<br>Total Count on This Engine, FTC, PFP, FCC |
| COMPRESSOR ROTOR ASSY | c6rotedit | Serial Number<br>TAN |
| TURBINE ROTOR DISC ASSY | | |
| INSTALLATION | c7rotadd | Serial Number<br>TAN |
| ABNORMAL TEMP / OVERSPEED DATA | c7rotedit | *none* |

FIG. 8b

Edit the Service Record

Hull Type: FFG-46

Installation Date: 06/16/1980

GAS GENERATOR ASMBY    LM2500    GGA007    1A

By (Activity): LITTON-INGALLS

Verified By: C. SCREETH

Notes: DD-992 APPLICABILITY

Mark for Deletion

[Save]  [Undo]  [Cancel]

FIG. 9

Add Custody and Transfer Record

GAS GENERATOR ASMBY | | LM2500 | | OGA007 | | 1A

LITTON INGALLS | | | | DD-892

From | | ▼ | | To

Verified Date | Serial Number | Authority
Date | 06/16/1980 | OGA007 | N00024-77-C-0275
06/16/1980

Verified By | | Cause
C. SORETH

Memorandum or Narrative

NEW SHIP DELIVERY TO NAVY

Mark for Deletion ▼ | Save | Undo | Cancel

| If the operation is that of adding a TD | |
|---|---|
| if dadding | variable dadding has a boolean value:<br>true- when user adds new record<br>false- when user modifies it<br>So in a case of addition query: |
| For adding, we select only those engines with the same or associated CI<br>and engine type: | |
| select ciasn from comptp12 where (comptp12.ci=addto_ci .or. comptp12.ci==have_ci .or. comptp12.ci==or_ci) .and. comptp12.ciasn!= section.ciasn .and. section.engine==comptp12.engine into array here | |
| Now all the engines that matched the criteria above would have the current TD<br>added to them | |
| ta=_tally<br>if ta>0<br>   for i=1 to ta<br>     nxt_ciasn=here[i]<br>     thisform.addtd()<br>   endfor<br>endif | If there're any results<br><br>For each element<br><br>call addtd() procedure |
| Else<br>…. | Otherwise we are modifying a TD |

FIG. 14a

| |
|---|
| For modifications, we only select engines that have the same or associated CI, engine type, and location. |
| select ciasn from comptp12 where (comptp12.ci==addto_ci .or. comptp12.ci==have_ci .or. comptp12.ci==or_ci) .and. comptp12.ciasn!= section.ciasn .and. comptp12.loc==section.loc .and. comptp12.engine==section.engine into array here |
| It selects CIASN(s) of engine records to be modified into an array and then calls the edittd() routine. |
| ta=_tally<br>    if ta>0<br>      for i=1 to ta<br>        nxt_ciasn=here[i]<br>        thisform.edittd()<br>      endfor<br>    endif<br>endif |

FIG. 14b

| ADD | MODIFY |
|---|---|
| addtd() – adding a record and carrying over user entered data | edittd() responsible for modifying a particular record matched by TD Number and TD Type and carrying over the user entered changes |
| *Carried over data :* | |
| TD Installation Date<br>TD Number<br>TD Title<br>TD Activity<br>TD Signature (Verified By)<br>TD Type<br>TD Category<br>TD Status | TD Installation Date<br>TD Activity<br>TD Status |
| *Respectively not carried over:* | |
| TD Revision Number | TD Title<br>TD Signature<br>TD Category<br>TD Revision Number |

| if substr(orig_ciasn,1,3)="GGA" | This line checks if CI of an engine the user is entering data for is GGA and if so: |
|---|---|
| have_ci="GGA"<br>addto_ci="PTA" | It sets variables which would be used for adding or editing records in further procedures, such as Current CI and Associated CI |
| if hadding<br>    thisform.add_related()<br>else<br>    thisform.edit_related()<br>endif<br>.....<br>endif | adding,<br><br>editing records in eng_ophours table<br><br>*(variable hadding has a boolean value:*<br>*true- when user adds new record*<br>*false- when user modifies it)* |

FIG. 19a

| ADD | MODIFY |
|---|---|
| add_related()- responsible for finding the engine on the same position and associated CI, adding a record, verifying status on an engine and carrying over user entered data | edit_related()-responsible for finding engine on the same position and associated CI, finding the particular record to change and carrying over user entered data |
| *Carried over data :* | |
| Date Recorded | Date Recorded |
| Hours Per Month | Hours Per Month |
| Starts Per Month | Starts Per Month |
| Since New (baseline) Hours | Mark for deletion (*Autolog*) |
| Since New (baseline) Starts | |
| *Respectively not carried over:* | |
| *Notes* | *Notes* |
| Status (N-New \|\| R-Repaired \|\| T-Test) | Status (N-New \|\| R-Repaired \|\| T-Test) |
| Calculated values (totals of hours/starts on engine) | Calculated values (totals of hours/starts on engine) |
| Since Rework (baseline) Hours | Since New (baseline) Hours |
| Since Rework (baseline) Starts | Since New (baseline) Starts |
| | Since Rework (baseline) Hours |
| | Since Rework (baseline) Starts |

FIG. 19b

| | |
|---|---|
| declare tc(1) | Declaration of one element array which would contain the latest status |
| tc[1]="N" | Setting default to "N"-new |
| sele testcell from eng_ophours ;<br>where ciasn=templocg.ciasn and ;<br><br>yophours_dt=(sele max(yophours_dt) ;<br>from eng_ophours where<br>ciasn=templocg.ciasn  and ;<br>testcell<>"T" and !empty(testcell)) ;<br>into array tc | Templocg here is a temporary table which has info(such as tan, tan_record, locatin,etc) on an engine for which data is carrying over. |
| | Selecting latest date for that engine where Status(testcell) is not "T"-test; |
| | Results of the query get written into array tc. If there're no results (no previous records or all previous records were test records) then tc[1]="N" doesn't get overwritten and it would be set as the Status of the engine |

FIG. 19c

COMPUTER-AUTOMATED LOGBOOK OF CONDITION-BASED DATA FOR MACHINERY MANAGEMENT

CROSS-REFERENCE TO RELATED APPLICATIONS

This application claims the benefit of U.S. Provisional Application No. 60/434,598, filed 18 Dec. 2002, inventor Edward L. Hilferty, entitled "Computer-Automated Logbook of Condition-Based Data for Machinery Management," incorporated herein by reference.

STATEMENT OF GOVERNMENT INTEREST

The invention described herein may be manufactured and used by or for the Government of the United States of America for governmental purposes without the payment of any royalties thereon or therefor.

BRIEF DESCRIPTION OF THE COMPUTER PROGRAM LISTING APPENDIX

Incorporated herein by reference is a Computer Program Listing Appendix, setting forth inventive embodiments of computer source code. This Computer Program Listing Appendix is contained as text documents that were created on 10 Nov. 2003 in a CD-R compact disc that is now situated in the application file. The CD-R compact disc contains three data files in ASCII file format, entitled "autolog.logbook.prg" (about 6 KB), "autolog.bupout.prg" (about 45 KB) and "autolog.import.prg" (about 8 KB). These files entitled "autolog.logbook.prg," "autolog.bupout.prg" and "autolog.import.prg" are also set forth as printout copies, as appendices "A" (5 pages), "B" (25 pages) and "C" (5 pages), respectively, in the aforementioned U.S. Provisional Application No. 60/434,598, filed 18 Dec. 2002, incorporated herein by reference.

BACKGROUND OF THE INVENTION

The present invention relates to data entry and/or data tracking, more particularly to computerized methodologies for entering and/or tracking data pertaining to operation, maintenance and/or configuration of objects such as machinery equipment.

All gas turbine ships in the U.S. Navy fleet are required to maintain a Marine Gas Turbine Equipment Logbook (MGTEL) containing official Marine Gas Turbine Equipment Service Records (MGTESR) for each main propulsion and auxiliary power engine. These logbooks track operating, maintenance and configuration data. The records are not only essential in maintaining proper operational efficiency of the units by the ships, but are also essential for engineering analyses and logistics support.

Current MGTEL/MGTESR practices represent a carry-over from U.S. Navy aviation practices. When gas turbines were selected for use on the U.S. Navy's surface ships, a variety of program practices from the aviation community were adopted and incorporated into the Marine Gas Turbine (MGT) programs. One such practice has been the maintenance of gas turbine logbooks to maintain configuration, component, maintenance and operational data. Ships use a pen-and-paper product (MGTEL) to maintain this type of data and to provide data updates, via naval message, to U.S. Navy offices. This data is then used to maintain two separate, automated data repositories, viz., CSA (configuration tracking system) and OPHRS (operating hours). Both databases are resident on mainframe computers and cost in excess of $600 thousand per year (FY 98 dollars) to maintain.

The above-described gas turbine data-tracking systems currently in place have their drawbacks. These multiple and separate data-tracking systems are redundant within and across platforms and with resultant discrepancies. Furthermore, these data-tracking systems are costly, inefficient, error-prone and largely inaccessible. The only way that off-ship activities can access the MGTEL/MGTESR data is for portions of the data to be copied into message format and transmitted via a paper document.

The U.S. Navy has customarily predicated its ship maintenance systems on time-directed preventive maintenance principles. Recently, the U.S. Navy has been transitioning in favor of condition-based maintenance (CBM) principles, with a view toward increasing readiness, decreasing maintenance and decreasing manning requirements. It would be desirable to practice a gas turbine logbook methodology that is consistent with CBM values.

SUMMARY OF THE INVENTION

In view of the foregoing, it is an object of the present invention to provide an improved logbook methodology for operation, maintenance and configuration of machinery such as gas turbines used aboard naval vessels.

The present inventor styles his invention the "AUTOLOG" (Automated Logbook). The present invention's AUTOLOG is a software product that automates the MGTEL/MGTESR. In addition to an automated platform for tracking the data by ship's force, AUTOLOG has built-in capabilities to transmit and receive data via the Internet. It has backup capabilities to upload data via a CD or disc and download data to a file for e-mail transmittal, thus obviating separate reporting. The AUTOLOG makes all of the logbook data accessible in real time. Furthermore, the AUTOLOG helps eliminate the need for separate databases by making one database accessible to all, thereby helping eliminate discrepancies associated with multiple databases with the same data due to multiple re-inputting.

In accordance with typical embodiments of the present invention, an automated logging system comprises a host computer and one or plural local computers. Each local computer is connected to the host computer and has resident in memory a computer program product that includes a computer useable medium having computer program logic recorded thereon. The computer program logic includes (i) means for enabling importation of information received from the host computer and (ii) means for enabling exportation of information for receipt by the host computer. Each local computer performs record keeping based on the reciprocal transmission of information between the host computer and every local computer. Each local computer includes a human interface, the computer program logic further including means for enabling display of information via the interface so as to facilitate human use of the local computer. The display is indicative of information entered by the human user and of information received from the host computer. According to usual inventive practice, the means for enabling display of information includes means for enabling variable display of information in accordance with the nature of the information. Many inventive applications involve machinery, wherein the record keeping is characterized by generally continual updating of information for tracking machinery. The display of information varies in accordance with categories of information, such categories including maintenance, repair, logistics, inspection, and operation, each display of information being associated with at least one category.

As a matter of course, the U.S. Navy has kept a hardcopy MGTEL/MGTESR logbook. The present invention's AUTOLOG, more generally referred to as the Marine Gas Turbine Information System (MGTIS), is an electronic, automated version of a hardcopy MGTEL/MGTESR logbook. The inventive AUTOLOG is a user-friendly program that can replace the hardcopy logbooks. The present invention's "AUTOLOG 2000" test version began prototype testing in November and December 1999 on four test platforms (CG's, 52, 56, 67 and DDG 67) with excellent reviews. Starting January 2002, U.S. Navy ships are receiving onboard and beginning to implement a perfected version of the inventive AUTOLOG. U.S. Navy ships are being provided a User's Manual along with the inventive AUTOLOG software. The U.S. Navy's transition to the inventive AUTOLOG is eased by that fact that the format of the inventive AUTOLOG is similar to that of the hardcopy logbook.

The AUTOLOG is borne of the U.S. Navy's realization of the existence of current logbook problems and the need to upgrade and reduce reporting requirements. The Naval Surface Warfare Center, Carderock Division (NSWCCD), reassessed the data requirements of the gas turbine fleet and life cycle management, and thus the entire process, from ship to report, has been overhauled, the result being the Marine Gas Turbine Information System (MGTIS) which is built around a ship's stand-alone, computer-based MGTEL application, viz., the present invention's AUTOLOG. The AUTOLOG is the foundation of the U.S. Navy's new MGTIS system, which is itself critical to the performance of life cycle management functions in the current operating environment, which is characterized by declining budgets, an aging MGT population, parts obsolescence, escalating program costs, U.S. Navy fleet downsizing and reduced support infrastructure, over-worked ships' personnel, and the need to make ships "smarter."

The AUTOLOG is a run-time application, providing all of the application programming needed. The minimum operating requirements for the ships are 133 MH Pentiums, 32 MB RAM, 20 MB hard drive space, Windows 95 or better, CD ROM drive, and Y2K compliance. Ships with Internet capability will be able to more fully utilize the AUTOLOG system's web-based application to transfer data and receive system upgrades.

The AUTOLOG format is similar to that of the hardcopy logbook, thus easing transition and providing an intuitive operating environment for logbook custodians. AUTOLOG requires data to be entered only once and eliminates the need for redundant independent record keeping by ship's force and the NSWCCD. AUTOLOG modifies and reduces ship's force data recording and reporting requirements (e.g., automating GGTB 4 compliance), and it is estimated that AUTOLOG will reduce these efforts by two-thirds on ship's force and by one-half on the NAVSEA side.

The MGTIS's AUTOLOG makes data more timely, flexible and reliable. Moreover, the AUTOLOG is more accessible with its data-view access through queries, reports and OBDC link capability, thus facilitating data retrieval, summary and analysis. The AUTOLOG is expected to result in a cost avoidance of 400K per year in NAVSEA database management and operating costs alone. The AUTOLOG puts all of the main data players on the same playing field, using one database, albeit different interface applications. Included among the main data players are repair and overhaul facilities, MGT logistics control activities, and shipbuilding contractors. Future enhancements to the AUTOLOG, as embodied for U.S. implementation, may include an ICAS link to electronically fed operating data (either directly to the AUTOLOG or the main database) and/or a link to the 3-M system.

The embodiment of the inventive AUTOLOG that is presently being instituted by the U.S. Navy is described in detail hereinbelow with reference to the drawings and appendices. In accordance therewith, upon the selection of a logbook category, a pull-down window for each section of the logbook category appears. When clicked, a section window opens to pages that are very similar to the hardcopy pages. As each section window opens, new information can be added to the service record via an "Add" function located at the bottom of the page. An existing entry can be edited by double-clicking such entry. "Maintenance Options" is where logbooks and/or new engines can be added. Once an entry is saved, it can be deleted or be modified. The edit-and-add screen remains the same.

A preferred embodiment of AUTOLOG (such as that which is described in detail hereinbelow) is, in essence, a data-entry and data-tracking FoxPro application. The present invention's AUTOLOG typically is a run time FoxPro engineering application, providing all the application programming needed to track engine maintenance and repair, logistic, inspection and operating data through a user interface. The minimum operating requirements for the ships are a computer with 133 MHz Pentium, 32 MB RAM, 20 MB hard drive space, Windows 95 or better, and CD ROM drive. The AUTOLOG has built-in forms that present database interface between the user and the data tables and programs. The forms present a more user-friendly way to move data in and out of tables. They allow multiple processing and have been built with the end-user in mind. They are formatted to be familiar to current, hardcopy logbook custodians. The form interface is segmented to track different types of gas turbine data similarly as are the hardcopy logbooks. However, the entire AUTOLOG "logbook," with all subsections, is accessible from one screen so that the user is able to select any of the subsections from the same screen.

The present invention's user interface is provided through specifically programmed and designed forms. Engine data is posted into various forms with the user tabbing between forms for viewing and editing. Different types of data are posted to different forms. Different data edit and input capabilities are provided on the forms with drop downs in some case, allowing choices of specific update data or choice of logical operators or values. Between different fields on the various forms the types of data may vary, with some restricted to particular data types and choices or some open ended to allow any data input. Certain fields require input and will produce a programmed error message if left blank. A user can select a record on the main form for edit by simply double clicking with the left mouse key. This generates a secondary form to allow data changes. An action button is available on all the main forms to allow for adding of new records. Hitting the action button generates the same secondary form the edit did, but with no returned data, thereby allowing the input of new data. Hitting an action button runs programming to carry out the defined action.

The present invention's programming runs on various levels of data update, depending on the action selected and the form being used. The programming may re-index, recalculate totals, append records, copy records, etc. These forms then are a user-friendly way to move data in and out of tables and allow multiple processing. They are segmented to allow for different types of data to be accessed separately so as not to cause confusion. Though technical and specific in the type of data these forms track, they are also broad and comprehensive in the level and variety of engine operating data handled, and could therefore have broader commercial applications, as well. Of great importance in inventive practice are the applications startup procedure programs and the data import and export programs. The export programming extracts all data table updates based on the last export run date and the dates of the record updates or additions and then extracts the new records into a specified format. The built-in File Transfer Protocol (FTP) Utility then allows the user to transmit the update file to a directory on the main data server. There are different levels of file import functionality, each with its own programming, with the main one being the ability to import new engine data.

According to a recent upgrade to the U.S. Navy's AUTOLOG embodiment, a copy-and-paste operation, reduces input effort on a particular form by allowing updates for an engine to carry over to the engine companion assembly, if wanted, and having any newly entered data in the Technical Directives to carry over to all like engines, if wanted. The upgrade further enables AUTOLOG to automatically calculate hours remaining on time-directed inspections, and flag the operator on remaining hours when the application is executed. In addition, the new AUTOLOG upgrade available delivers a maintenance capability enabling the operator to make data file backups and import them if the AUTOLOG needs to be reinstalled. An important capability is the ability to import new engine data that will simply replace the data for the old engine. It is an import and replace utility that writes over old data and re-indexes.

The inventive programs to process the user input represent critical aspects of the present invention's AUTOLOG. In some cases, non-user entered data is added to the tables, calculations are performed, data is transformed, coding is added, updated data (e.g., updated dates) are added, etc. Of primary importance are the startup procedure programs and the data export and import programs. The import/export programs link the application indirectly to a main database. They minimize user effort with the ability to update tables directly from an outside source and make data available effortlessly beyond the bounds of the application itself, in a format directly readable into the U.S. Navy (e.g., NAVSEA) database.

The inventive AUTOLOG program was designed by the inventor using Microsoft Visual FoxPro. AUTOLOG is a database application that collects data entered into the MGTEL/MGTESR logbooks. This data can then be exported to a master database and can easily be accessed by other necessary applications. Also, this allows logbook data to be entered directly into the master database (e.g., by naval depot organizations, etc.), from which it can be exported and formatted in a manner allowing direct import of Engine Data, Ship Data and Data Backups into an "AutoLog" or Automated Logbook. The AUTOLOG embodiment currently practiced by the U.S. Navy essentially represents an automated MGTEL (Marine Gas Turbine Equipment Logbook), which contains official MGTESR (Marine Gas Turbine Equipment Service Records) for each main propulsion and auxiliary power engine.

The following article, incorporated herein by reference, was authored by the inventor and appears in a U.S. Navy periodical: Hilferty, Edward L., "AUTOLOG 2000 Revolutionizes the Maintenance of Gas Turbine Logbooks," Wavelengths, Naval Surface Warfare Center, Carderock Division, December 1999, page 31. Also incorporated herein by reference is the following conference paper authored by the inventor: Hilferty, Edward L., "Condition Based Maintenance, Life Cycle Management, and AUTOLOG," 11th International Conference on Computer Applications in Shipbuilding (ICCAS 2002), Malmoe, Sweden, 9-12 Sep. 2002.

The U.S. Navy is in the process of moving toward "condition-based" (or "condition-directed") maintenance. In furtherance of condition-based maintenance goals, the inventive AUTOLOG is expected to play an important role in terms of providing automated reasoning and decision-making models for data tracking such as that which involves the monitoring of equipment operations. The objective of the U.S. Navy's "Condition Based Maintenance" (CBM) is to transform from time-directed preventive maintenance to condition-directed maintenance. It is hoped that this transition will optimize readiness while reducing maintenance and manning requirements.

The underlying concept of CBM is that the utilization of sensors, algorithms and automated reasoning and decision-making models to monitor equipment operations will provide critical analyses to operators that will help prevent impending failure. "Red flags" will appear to operators so that maintenance efforts can focus limited resources on areas most needed to ensure safety and mission readiness, while at the same time minimizing operating costs, labor and risk of mission-degrading failure. It is anticipated, at optimal capacity, CBM technology will: detect and classify impending failures; predict the remaining life cycle of equipment; interface with the control system to take action; provide support in performing corrective maintenance; provide data to life cycle management activities; and, update logistics support system. The expectation is that significant improvements in safety, reliability and affordability will ensue.

Incorporated herein by reference is an updated version of the *Marine Gas Turbine Information System Autolog User's Guide* (hereinafter referred to as the "*Autolog User's Guide*"), containing 133 pages, issued to Navy personnel for Navy use by the Department of the Navy, Naval Sea Systems Command (NAVSEA), Naval Surface Warfare Center Carderock Division (NSWCCD), Auxiliary Gas Turbine Branch, Code 935. The *Autolog User's Guide* was written and prepared by the present inventor, Edward L. Hilferty, an engineering statistician employed by NSWCCD in Code 9354 at the Philadelphia location. The *Autolog User's Guide* is available on the Internet at the U.S. Navy Marine Gas Turbines website, www.navygasturbines.org. The Autolog User's Guide may be found by clicking, as appropriate, starting on the main page, http://www.navygasturbines.org/index.html; or by going directly to http://www.navygasturbines.org/prognewsmgt.asp and clicking, as appropriate; or by going directly to http://www.navygasturbines.org/pdf/UGAutolog.pdf. A previous version of the *Autolog User's Guide* (the version thereof as originally appeared on the Internet in 2002) is included, as a print copy (120 pages), in the aforementioned U.S. Provisional Application No. 60/434,598, filed 18 Dec. 2002, which is incorporated herein by reference.

Incorporated herein by reference is an updated version of the *Autolog Training Guide*, containing 58 pages, issued to Navy personnel for Navy use by the Department of the Navy, Naval Sea Systems Command (NAVSEA), Naval Surface Warfare Center Carderock Division (NSWCCD), Auxiliary Gas Turbine Branch, Code 935. The Autolog Training Guide was written and prepared by the present inventor, Edward L. Hilferty. The *Autolog Training Guide* is available on the Internet at the U.S. Navy Marine Gas Turbines website, www.navygasturbines.org. The *Autolog User's Guide* may be found by clicking, as appropriate, starting on the main page, http://www.navygasturbines.org/index.html; or by going directly to http://www.navygasturbines.org/prognewsmgt.asp and clicking, as appropriate; or by going directly to http:// www.navygasturbines.org/autotrain.pdf. A previous version of the *Autolog Training Guide* (the version thereof as originally appeared on the Internet in 2002) is included, as a black-and-white (grayscale) printout copy (58 pages), in the aforementioned U.S. Provisional Application No. 60/434, 598, filed 18 Dec. 2002, which is incorporated herein by reference.

Other objects, advantages and features of this invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawings, wherein like numbers indicate the same or similar components, and wherein:

FIG. 2a and FIG. 2b together show an example of code pertaining to the Send File Option of an embodiment of the present invention's AUTOLOG program.

FIG. 4a shows an example of code pertaining to the Receive File Option of an embodiment of the present invention's AUTOLOG program.

FIG. 8 is a pictorial representation, similar to that described by FIG. 1, of an inventive AUTOLOG program embodiment's Module and Engine edit forms.

FIG. 8a shows an example of code pertaining to the Add and Edit Module/Engine Data Forms of the Operating Log section of an embodiment of the present invention's AUTOLOG program.

FIG. 8b shows an example of required fields pertaining to the Add and Edit Module/Engine Data Forms of the Operating Log section of an embodiment of the present invention's AUTOLOG program.

FIG. 9 is a pictorial representation, similar to that described by FIG. 1, of an inventive AUTOLOG program embodiment's Edit the Service Record form.

FIG. 10 is a pictorial representation, similar to that described by FIG. 1, of an inventive AUTOLOG program embodiment's Add Custody and Transfer Record form.

FIG. 11 is a pictorial representation, similar to that described by FIG. 1, of an inventive AUTOLOG program embodiment's Edit the T.I. Engine Inspection form.

FIG. 12 is a pictorial representation, similar to that described by FIG. 1, of an inventive AUTOLOG program embodiment's Edit the Record of Rework form.

FIG. 13 is a pictorial representation, similar to that described by FIG. 1, of an inventive AUTOLOG program embodiment's Edit Logbook Working History form.

FIG. 14 is a pictorial representation, similar to that described by FIG. 1, of an inventive AUTOLOG program embodiment's Edit Technical Directive form.

FIG. 14a and FIG. 14b together, and FIG. 14c, show examples of code pertaining to the Edit Technical Directive form of an embodiment of the present invention's AUTOLOG program.

FIG. 15 is a pictorial representation, similar to that described by FIG. 1, of an inventive AUTOLOG program embodiment's Edit Engine Components form.

FIG. 16 is a pictorial representation, similar to that described by FIG. 1, of an inventive AUTOLOG program embodiment's Edit the Compressor Rotor Components form.

FIG. 17 is a pictorial representation, similar to that described by FIG. 1, of an inventive AUTOLOG program embodiment's Edit the Turbine Rotor Components form.

FIG. 19 is a pictorial representation, similar to that described by FIG. 1, of an inventive AUTOLOG program embodiment's Edit Engine Hours and Starts form.

FIG. 19a, FIG. 19b and FIG. 19c show examples of code pertaining to the Edit Engine Hours and Starts form of an embodiment of the present invention's AUTOLOG program.

DETAILED DESCRIPTION OF THE INVENTION

Figure 1:
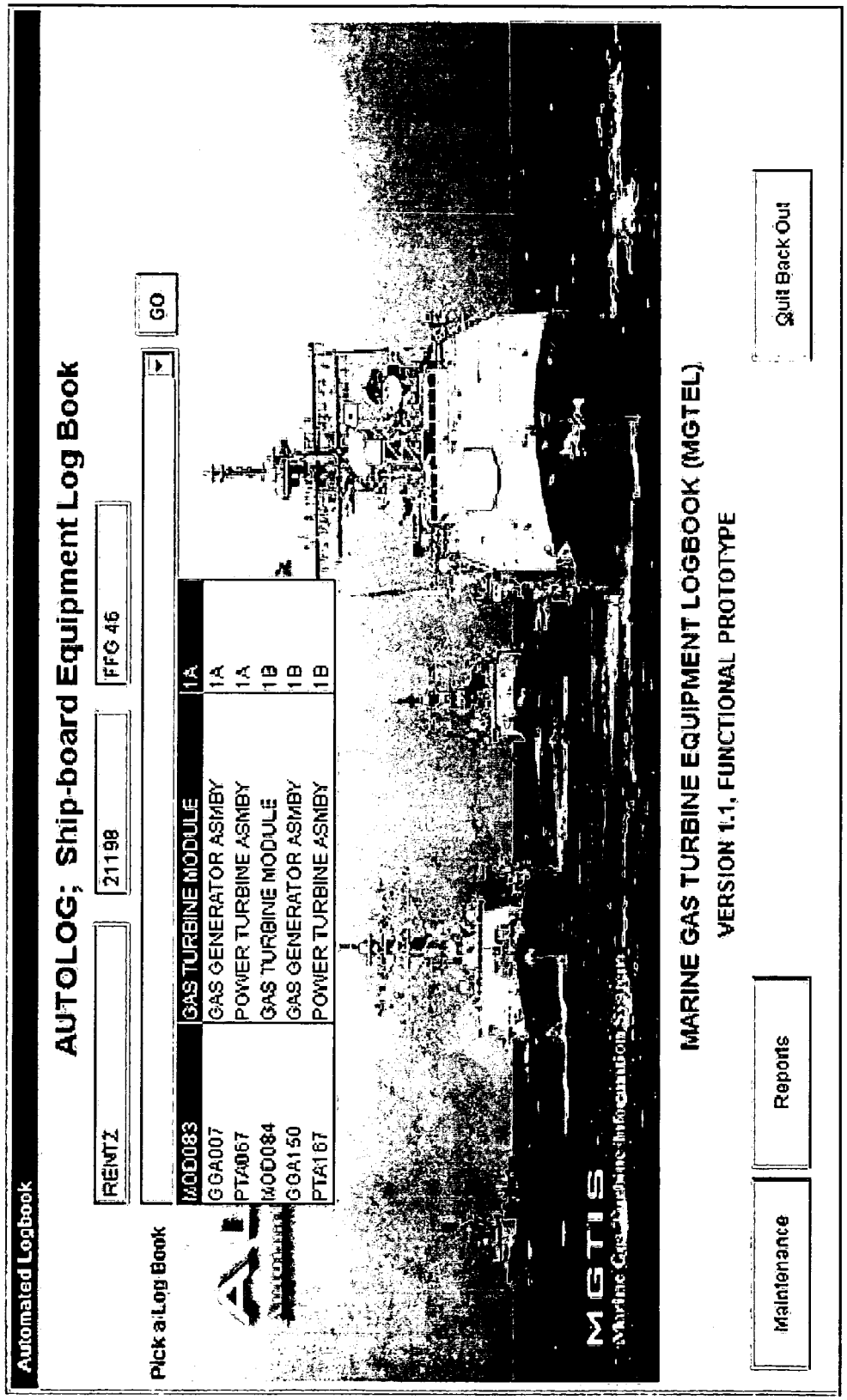
FIG. 1 is a pictorial representation of a computer user interface display window in accordance with an embodiment of the present invention's AUTOLOG program, wherein the display window is shown to contain the AUTOLOG program's main form, viz., the Automated Logbook Form.
Figure 1A:
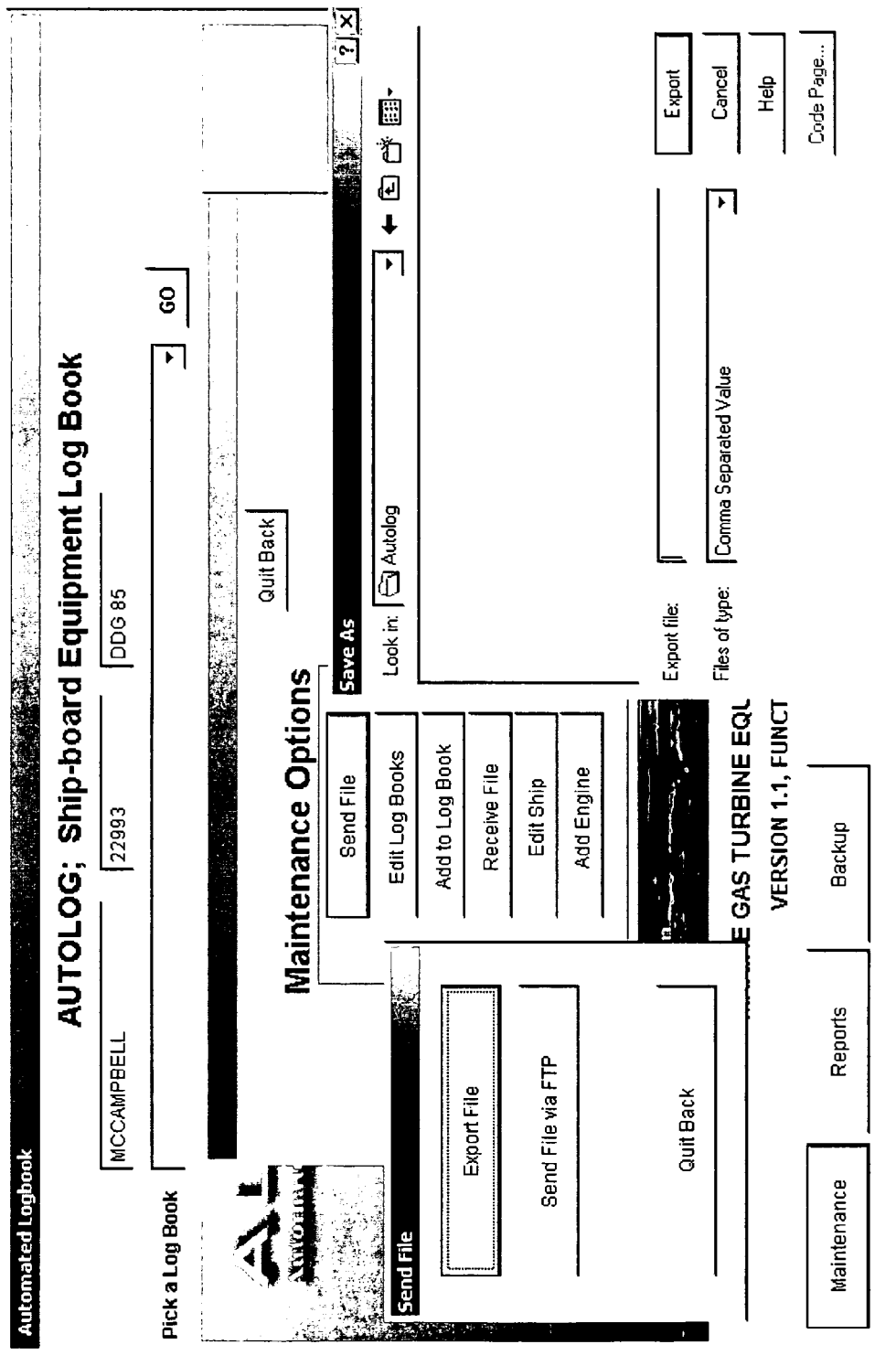
FIG. 1a, FIG. 1b and FIG. 1c are each a pictorial representation similar to that described by FIG. 1, wherein the display window is shown to contain an inventive AUTOLOG program embodiment's Automated Logbook Form as the backdrop, along with various, smaller, superimposed forms/boxes/screens.
Figure 1B:
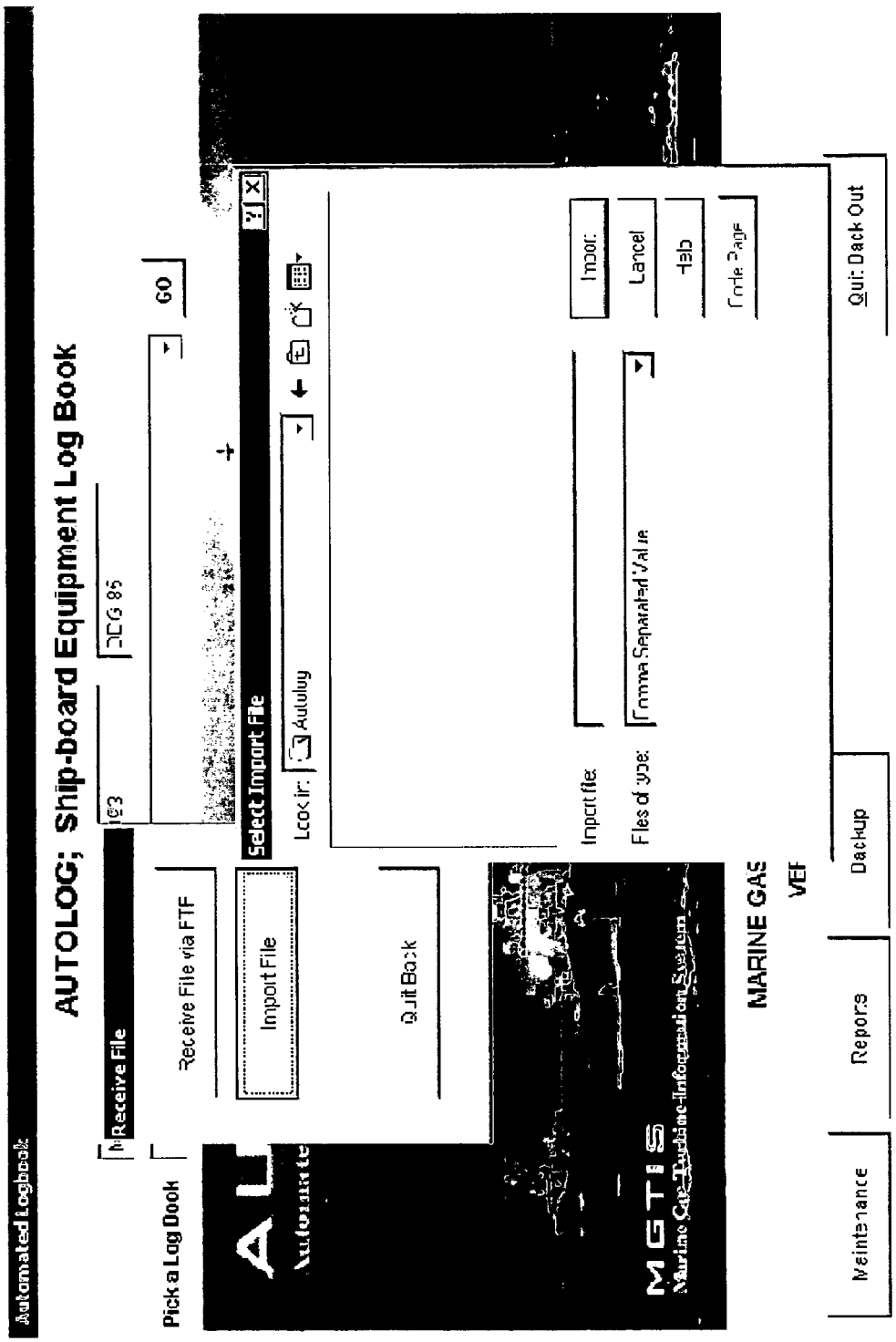
Figure 1C:
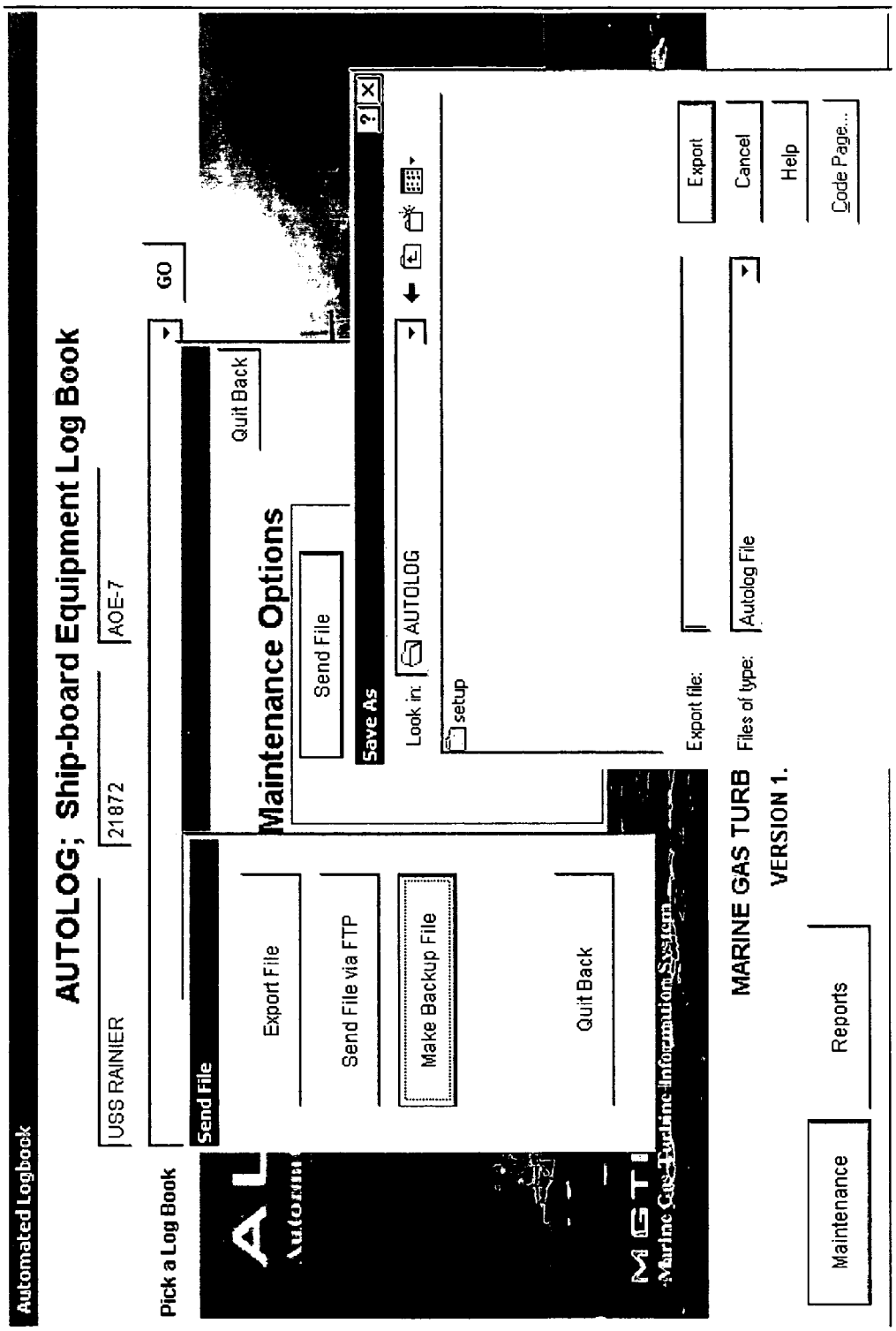

Reference now being made to the figures, the AUTOLOG format is similar to a hardcopy logbook in both layout and data tracked, thereby easing transition and providing an intuitive operating environment for logbook custodians. Once the AUTOLOG is opened, the user uses a drop down to select an engine to work on, and then uses an action button to retrieve all the data for the engine. This data is then posted into various forms for viewing and editing. Different types of data are posted to different forms. The user tabs between these forms that were designed and built to track specific engine operating data. There are separate forms to track engine operating hours and starts, engine installation history, technical directive accomplishment, etc. The types of data my be restricted to particular data types and choices or may be open ended to allow any data input. For example, the operating hour form requires that a date be input in a specific date format, the monthly hours and starts be input in numeric format, an engine status code be selected from a closed list of choices displayed in a drop down, and also provides a narrative text field for user input of any alpha-numeric text desired.

Certain fields require input and will produce a programmed error message if left blank. A user can select a record on the form for edit by simply double clicking with the left mouse key. This generates a secondary form to allow data changes. An action button is available on all the forms to allow for adding of new records. Hitting the action button generates the same secondary form the edit did, but with no returned data, thereby allowing the input of new data. Hitting an action button runs programming to carry out the defined action. Hitting a save button after adding new data, for example, will run programming that will append the record to the appropriate data table, add the necessary record identification number, add a new record input date, make the required hierarchical record linkage, update the index files, and so on. In some cases the data input will trigger even more programming. For example, adding a new monthly hours record will trigger multiple level programming that will both add the same newly input data to the engine's companion assembly and readjust the engine hour and start totals for both the engine and its companion assembly, thereby limiting the data input requirement for the user. These forms thus are a user-friendly way to move data in and out of tables and allow multiple processing. They are segmented to allow for different types of data to be accessed separately's as not to cause confusion. Though technical and specific in the type of data these forms track, they are also broad and comprehensive in the level and variety of engine operating data handled, and could therefore have broader commercial applications, as well.

The applications startup procedure programs and the data import and export programs are crucial. The export programming extracts all data table updates based on the last export run date and the dates of the record updates or additions, and then extracts the new records into a specified format. The built-in File Transfer Protocol (FTP) Utility then allows the user to transmit the update file to a directory on the MGTIS server. There are different levels of file import functionality, each with its own programming, with the main one being the ability to import new engine data. Once the operator hits the "Maintenance" and "Add Engine" action buttons, he/she uses a drop down to select the old engine to be replaced and hits the "Replace" action button. The program will display a screen for him to specify the location of the new data. Then, hitting the next "Replace" action button on this screen will activate a program to overwrite all the old designated engine data will the new data. The index files must be adjusted and are done so automatically.

The inventive AUTOLOG, as presently implemented by the U.S. Navy, requires data to be entered only once by the ship and then transmitted to NSWC (Naval Surface Warfare Center), and eliminates the need for redundant independent record keeping by ship's force and NSWC. It modifies and reduces ship's force data recording and reporting requirements, and is estimated to reduce this effort on ship's force by two-thirds and by one-half on the NSWC side. The estimated savings by ship's force is due to automated processing at various levels of the AUTOLOG. For example, hours and starts recorded on one engine can be carried over automatically to the companion assembly. The custodian will no longer be required to do math by summing hours and starts for a completed page, generate new engine totals, and then carry them over to a new page. He or she will no longer have to make and validate hour/start entries in the companion assembly, unless there is a removal, nor make extensive corrections to the monthly or total values based on feedback from the NSWC.

A new upgrade available within the U.S. Navy reduces the effort in recording Technical Directives (TDs) by allowing updates for an engine to carry over to the companion assembly if wanted and having newly entered TDs carry over to all like engines if wanted, reducing the entry effort in this section by up to seven-eighths. The upgrade further enables AUTOLOG to automatically calculate hours remaining on special inspections (time directed) and flag the operator on remaining hours. The total since installation time will be calculated automatically on all selected components of the engine that are currently tracked in the log records, and eliminates the need to have data cards for each component, which were very often incomplete, inaccurate, or missing all together and thereby necessitated reconstruction or correction by ship's force. These Selected Component Record cards, which followed a component, were particularly burdensome to maintain by the fleet. With the component data tracked in a database and only updated at installation or removal by ship's force, these cards could be eliminated. In addition, some of the data previously maintained in the hard copy records (for example, blade serial numbers) will no longer by tracked in the AUTOLOG, but rather directly in the MGTIS by other activities. Further, having data in an electronic format that can be easily transmitted to the NSWC eliminates the need altogether of the ship's force having to extract log data on a quarterly basis from their hard copy log records to reconstruct six months of operating, TD, and configuration change data into a message format (General Gas Turbine Bulletin #4, GGTB4) and sending it to the NSWC.

Electronic data transmitted to the NSWC for review and then direct download into the MGTIS eliminates the need for the NSWC to process the message data and then convert and input the data into two different mainframe databases. This effort was labor intensive and redundant to some degree. There would be input errors and discrepancies between the databases causing some confusion. The databases were not linked and not directly accessible to any other activities, very expensive to house and maintain, particularly database management support at the mainframe locations, and very difficult to institute programmatic changes in either database management or to satisfy evolving customer needs.

Figure 20:
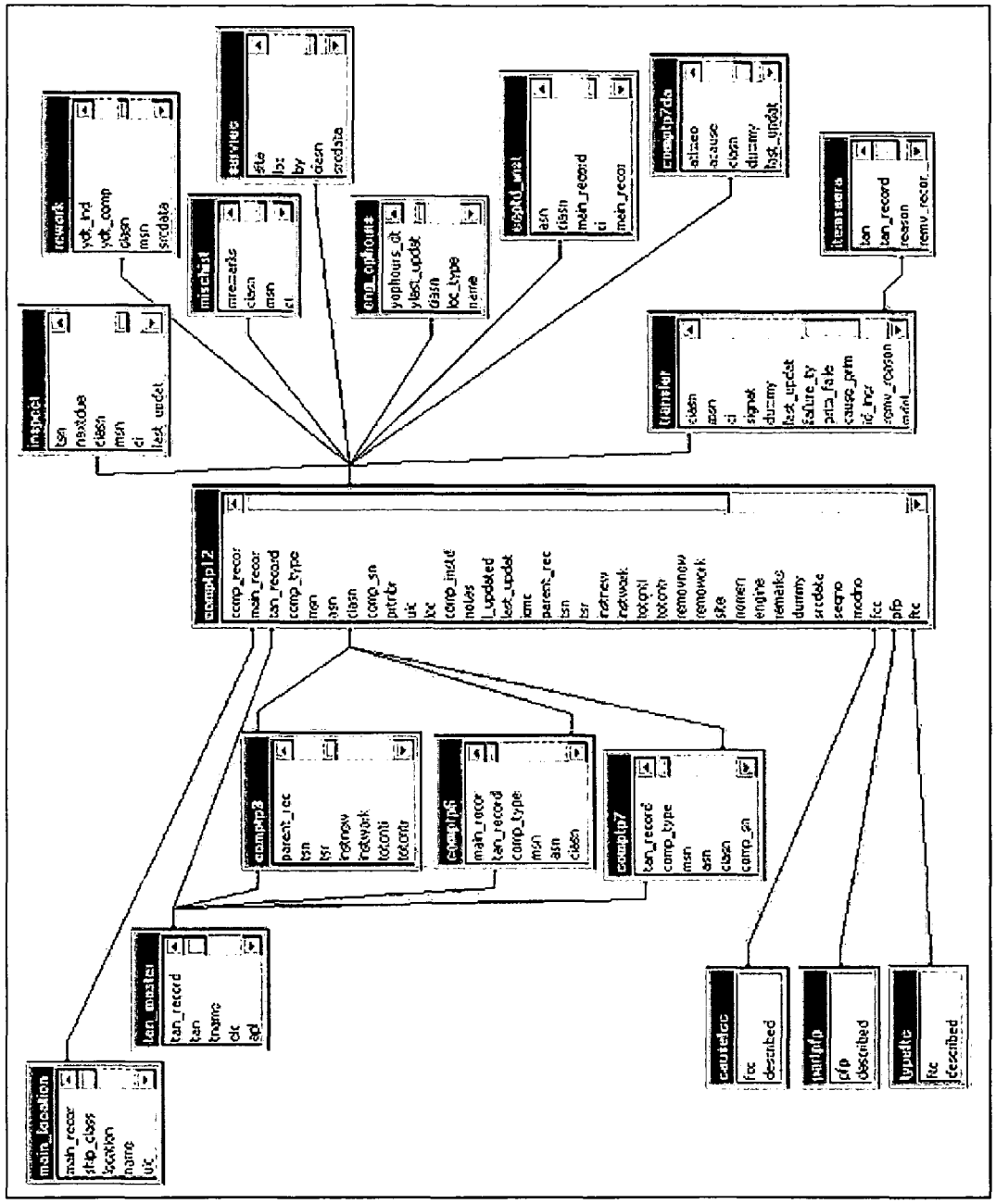
FIG. 20 is an entity relationship diagram illustrating relationships among various categories/sections of an embodiment of the present invention's AUTOLOG program.
Figure 21:
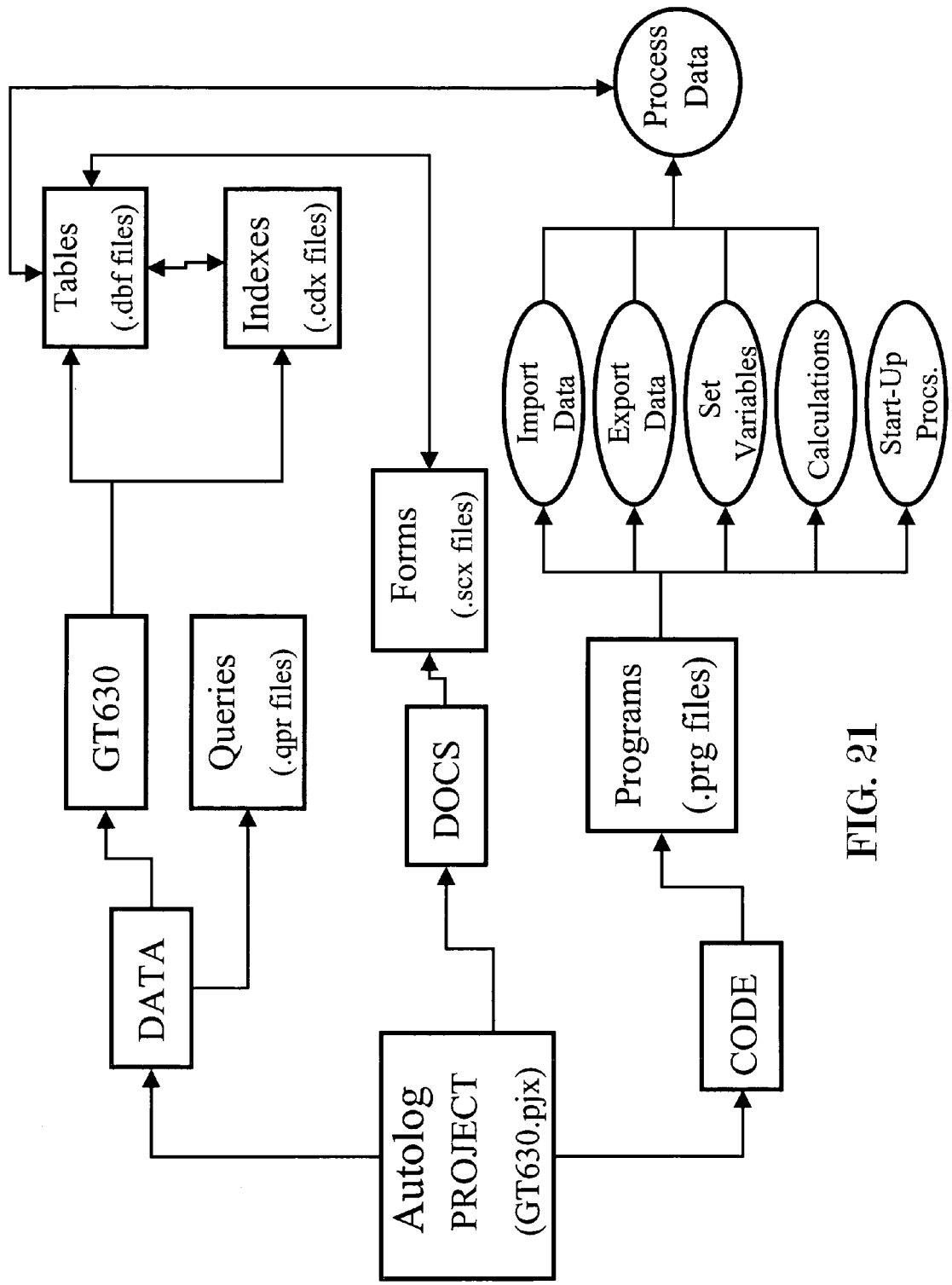
FIG. 21 is a block-and-flow diagram illustrating operation of an embodiment of the present invention's AUTOLOG program.
Figure 22:
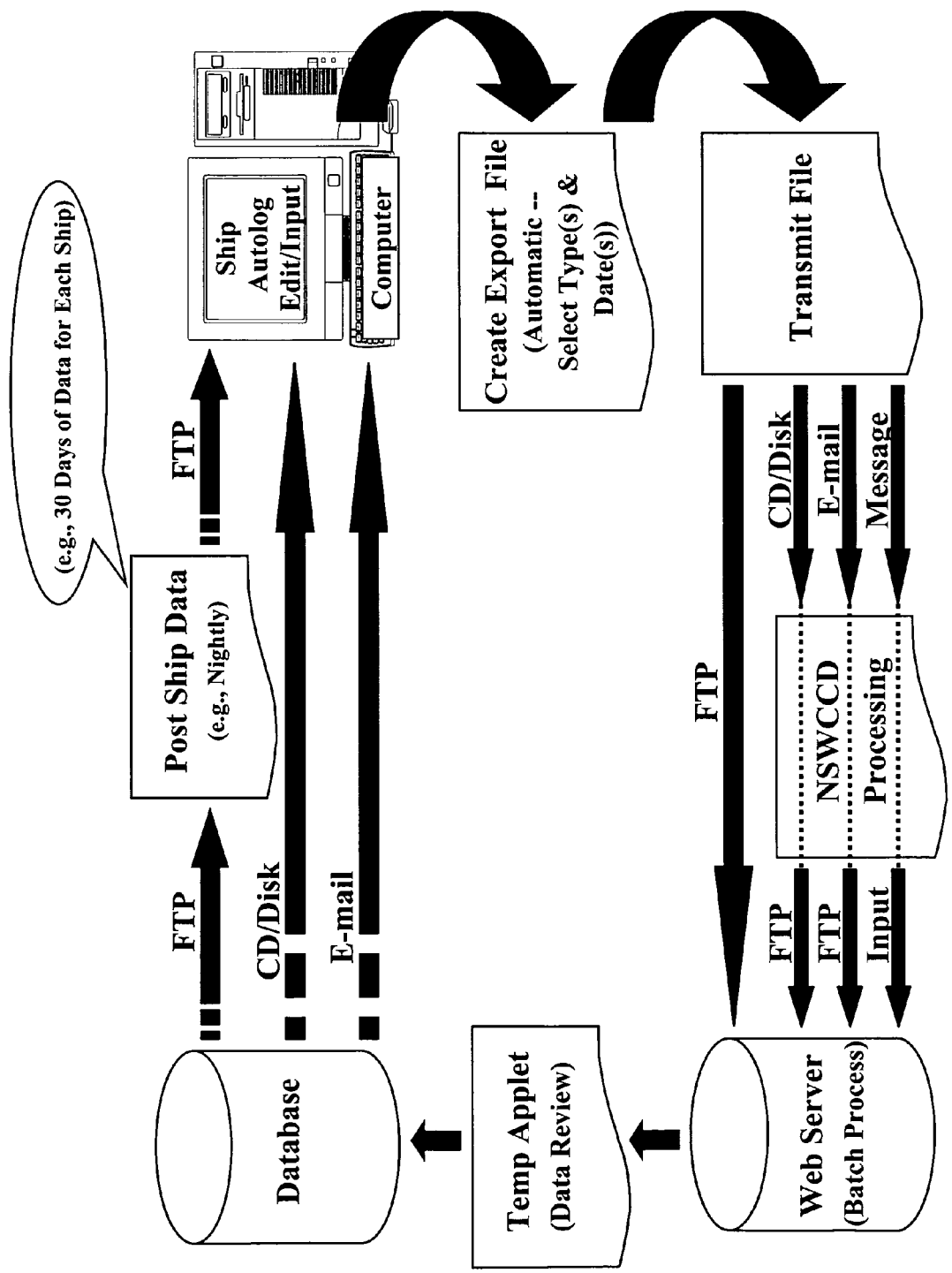
FIG. 22 is a block-and-flow diagram illustrating web-based application of an embodiment of the present invention's AUTOLOG program.

FIG. 20, FIG. 21 and FIG. 22 illustrate various aspects of the present invention in overview fashion. FIG. 22 illustrates the data exchange between AUTOLOG and MGTIS. According to the inventive AUTOLOG, the ships are given various options in transmitting data, with the primary one being an AUTOLOG built-in utility for using the FTP application mentioned hereinabove. Ship's force, at regular monthly intervals, simply utilizes the AUTOLOG's export utility to create a file of the input AUTOLOG updates and then use the FTP utility to send the file directly to one of the MGTIS servers. Barring the ability to FTP a file off the ship, the second best option for them is to simply e-mail the file to the NSWC.

As previously described herein, the data extracted by AUTOLOG are all of the updates input since the last time an update file was created. This would include any updates from all sections of the AUTOLOG. As such, not only does it provide data in a readily downloadable electronic format, but provides much more data than previously available, especially the Miscellaneous History section that provides narrative maintenance information, with little effort by ship's force in preparing and transmitting the data.

In addition, the U.S. Navy's new AUTOLOG upgrade delivers a maintenance capability enabling the operator to make data file backups and import them if the AUTOLOG needs to be reinstalled. They can create a new "log book"

within AUTOLOG for a new engine if they desire. The can import an entirely new AUTOLOG if need be. A critical capability is the ability to import new engine data that will simply replace the data for the old engine. It's a simple import and replace function whereby the operator simply identifies the unit to be replaced, the source of the new engine data, and then uses the import utility to replace the old data. This process not only eliminates manual effort of data input, but also helps maintain data reliability. This new engine data is available from a number of sources. A CD containing the engine data should accompany the unit in the engine can. In addition, the data can be e-mailed to the ship if need be, or can be made available directly from a web site for download.

Upgrades to the AUTOLOG operating system can be accomplished by having ship's "copy" and "paste" upgrade applications into their AUTOLOG directory that replaces the older version. AUTOLOG received SPAWAR certification and CINCFLT endorsement with distribution and implementation promulgated in GGTB #3 and a CINCFLT endorsed Fielding Plan. To date, the main implementation issue encountered involves unstable IT platforms on some of the ships. This has caused loss of data, and in some cases loss of AUTOLOG functionality. Though the new upgrade backup and recovery capability does in part mitigate this, it does require user interface. It should be noted that the fleet, due to limitations on Internet access by the fleet on a 24/7 basis, required a stand-alone application. It was required that each ship maintain a log record in some format on the ship without any requirement for outside access.

The present invention's AUTOLOG is the foundation of the new MGTIS system, which is itself critical to the performance of life cycle management functions in an operating environment of declining budgets, an aging gas turbine population, parts obsolescence, escalating program costs, fleet downsizing and reduced support infrastructure, over-worked ships personnel, and the need to make ships "smarter." The new MGTIS system includes data support activities such as fleet, new construction, overhaul and logistics, and reports and queries on line. The data tracked in AUTOLOG is the same data tracked in the original, hardcopy MGTELs and encompasses, in essence, operating times, logistic changes, technical directive compliance for modifications and inspections, and repair and maintenance data.

The AUTOLOG lists all of the engines and ancillary sections on the ship. Once a particular unit is selected, the operator is taken to the log records for the selected unit. The first two sections, Service Record and Custody and Transfer, track the installation and custodial history of the unit. A new feature of the AUTOLOG Custody and Transfer section is the ability of operators to select codes indicating the reason for an engine removal. This would supplement information provided in the Miscellaneous History section described hereinbelow.

The Operating Log section tracks the monthly hours and starts on the unit, as well as notes any unusual operating condition(s). The Inspection Record tracks all special (time base or bulletin mandate) or conditional (event driven) inspections of the engine. This basically is inspection identification data such as bulletin number, activity, dates started and completed, and, if applicable, engine hours at which the inspection was done and when it is next due. Results of the inspections are recorded in the Miscellaneous History section. The Record of Rework section provides basic information (dates and activities) of engine repair work. The basic nature of the repair is recorded in the Miscellaneous History section.

The Technical Directives (TDs) section records the status of all configuration change requirements or mandated inspections. Technical Directives are used when an action required affects an integral part of the Marine Gas Turbine Equipment. It is critical to know if and when such mandated changes or inspections are done. Heavily involved in this are safety, performance; logistics, and costs issues. For example, some TDs have an urgent category classification because safety may be an issue. In addition, knowing how many engines still need a TD accomplished enables a more accurate count on the number of kits that will need to be purchased and stocked in order to finish the installation across the fleet. This is a big cost issue. In this section is recorded TD type, status, category, TD number, dates, and a verifying name.

The Selected Component section tracks various components on an engine, such as starters, fuel controls, PLA actuators, etc. It records serial numbers, part numbers, dates, engine hours at installation and removal, and removal causes. The Miscellaneous History section is one of the most critical sections, and one that the life cycle managers did not previously have ready access to. It records, in narrative format, supporting data/history of operational events, maintenance actions, inspections, or troubleshooting activities. It serves to record information for which no other place has been provided. Specifically, its to record details and circumstances of significant engine or component damage, abnormal operating conditions, details of troubleshooting and repairs, unscheduled or non-routine component replacement, inspection results, special test data, yard periods, engine lay-up procedures, etc.

The MGTIS stores data in an ORACLE 8.0.5 database and is edited through a Java Applet Interface. The applet uses swing components and retrieves and sends data through a JDBC thin client connection. Reports are generated on the web through use of Pearl scripts accessing the MGTIS. While direct access to the MGTIS is restricted to needed update activities, access to the reports on a separate query site will make the gas turbine data available to a broader gas turbine community. MGTIS not only makes data more timely, flexible, and reliable, it is more accessible with data view access through queries, reports, and OBDC link capability, for data retrieval, summary, and analysis. It is expected to result in a cost avoidance of 400K per year in NSWC database management and operating costs alone. It puts all the main data players on the same playing field, using one database, though different interface applications. Included are repair facilities, MGT logistics control activities, and ship building contractors.

The success of AUTOLOG, as practiced by the U.S. Navy, will depend on AUTOLOG's ability to transmit data reliably and easily from the ship to the shore support life cycle engineers, and the NSWC's ability to provide the ship AUTOLOG updates when the ship receives a new gas turbine or new maintenance requirements. The data transmittal loop is shown in FIG. 22. While AUTOLOG provides neither diagnostic nor prognostic analyses back to the operator based on embedded algorithms, nor eliminates the manually intensive process of ship force personnel monitoring the gas turbines and taking necessary corrective actions, AUTOLOG does enhance the process of CBM performance by automating large segments of data and making it more readily and easily analyzable. It is noted that CBM works on a number of levels, including monitoring, detecting, diagnosis, prognosis, prescribing and executing. But the complementary capability of providing data to all of the necessary personnel cannot, and must not, be overlooked.

Though intuitive, it must be emphasized that the data provided must be in a useable format. Often in the past, gas turbine monitored data has been in a raw data format that, in-and-of itself, was not useful. Part of AUTOLOG's utility lies in providing more real-time CBM data to a broad base of support activities in an easily understandable and familiar format. This data, besides providing more immediate feedback to the life cycle engineers on the gas turbine condition, will allow much easier metrics analyses than the current, multiple data source methods—such analyses being necessary to assemble all the data that is also recorded in the logbooks. This is an extremely tedious time and labor-intensive effort but produces vital information. It allows trending and identification of emergent issues.

The U.S. Navy's AUTOLOG conversion involved no change in data tracking requirements and no new hardware requirements. Training requirements were minimal for personnel familiar with the hard copy MGTEL. The computerized format and automatic update features within AUTOLOG have made logbook update less labor-intensive. The update file generation and file transmission features enable an almost effortless capability to provide all AUTOLOG updates on a regular basis. Though much less labor-intensive than previous logbook maintenance, the AUTOLOG currently requires manual data input. While, as stated hereinabove, some of the update process is automatic, the very nature of the type of data recorded in other sections precludes an easy automatic update procedure.

For example, as previously noted herein, in the Miscellaneous History section of the AUTOLOG is recorded in narrative form all results of significant engine/component damage or abnormal characteristics, maintenance actions, trouble shooting, inspection results, failure or downtime causes, operational events, unscheduled and non-routine component replacement, and, in general, anything else related to the gas turbine for which no other place has been provided. Similarly, in the Technical Directive section is recorded compliance with the directives that may or may not involve a configuration change to the equipment itself. Clearly, however, some of the manually recorded data is amenable to automation; the Operating Log section is a prime example of this. Recorded in the Operating section are operating hours and starts for the gas turbine based on specified criteria for determining a successful start.

The present invention's AUTOLOG application as embodied for U.S. Navy use—a preferred embodiment of the present invention's AUTOLOG—is more specifically described hereinbelow. Provided for certain aspects of the present invention are samples of the AUTOLOG program code. Provided for other aspects of the present invention are the entire AUTOLOG programs pertaining thereto. In any event, for each important aspect of the AUTOLOG, the programming logic is provided hereinbelow. The following "table of contents," which lists headings, subheadings and subsubheadings, represents the organizational scheme of the remaining portion of the instant detailed description:

1.0. Main Form
2.0. Navigation to Data Editing Screens
3.0. Performing Maintenance
3.1. Send File Option
3.2. Edit Log Books Option
3.3. Add to Log Book Option
3.4. Receive File Option
3.5. Edit Ship Option
3.6. Add Engine Option
3.7. Generating Backups
4.0. Generating Reports
5.0. Editing Module and Engine Data
5.1. Module/Engine Tabular Sections
5.1.1. Operating Log Tab Section
5.2. Add and Edit Module/Engine Data Forms
5.2.1. Add/Edit Service Record Form
5.2.2. Add/Edit Custody and Transfer Record Form
5.2.3. Add/Edit Inspection Record Form
5.2.4. Add/Edit Rework Record Form
5.2.5. Add/Edit Miscellaneous History Form
5.2.6. Add/Edit Technical Directives Form
5.2.6.1. Adding a Technical Directive
5.2.6.2. Modifying a Technical Directive
5:2.6.3. Code Implementation
5.2.7. Add/Edit Selected Component Record Form
5.2.8. Add/Edit Compressor Rotor Assembly Record Form
5.2.9. Add/Edit Turbine Rotor Component (Installation) Record Form
5.2.10. Add/Edit Abnormal Temp Data Form
5.2.11. Add/Edit Hours and Starts Form
5.2.11.1. Operational Hours
5.2.11.1.1. Adding Operational Hours
5.2.11.1.2. Modifying Operational Hours 1.0. Main Form Referring now to FIG. 1, the present invention's AUTOLOG program opens with a main form entitled "Automated Logbook" from which the user can navigate to desired data editing and maintenance tasks. Displayed on this form is the name, uic and hull information about the ship for which data has been loaded into the program. These fields are displayed in read-only text boxes, and the information is obtained from the one record in the main_location table.

It is noted that the AUTOLOG actually begins by executing the Logbook.prg. This program is responsible for declaring public variables and setting their default values, error handling, and starting the entryform.scx (the first form in AUTOLOG), which prompts the user for a user name and password. Reference is hereby made to the Computer Program Listing Appendix, wherein the Logbook.prg program is presented as a txt file entitled "autolog.logbook.prg."

2.0. Navigation to Data Editing Screens

As shown in FIG. 1, located on the Automated Logbook Form, directly beneath ship data fields, is a drop-down box labeled "Pick a Log Book," where specific logbooks can be chosen for editing. The dropdown box is populated from the comptp12 table and displays ciasn, nomen, and loc information for each engine and module on the ship. After making a module or engine selection from the dropdown box, the user clicks on the "GO" button to the right of the dropdown box to open the module or the engine information forms for editing. This is accomplished by populating the temporary table (section) with the desired module or engine information and then opening forms modbook or bigbook4 for modules or engines respectively. Further explanation in this regard is provided hereinbelow in the "Editing Module and Engine Data" section.

3.0. Performing Maintenance

Figure 2:
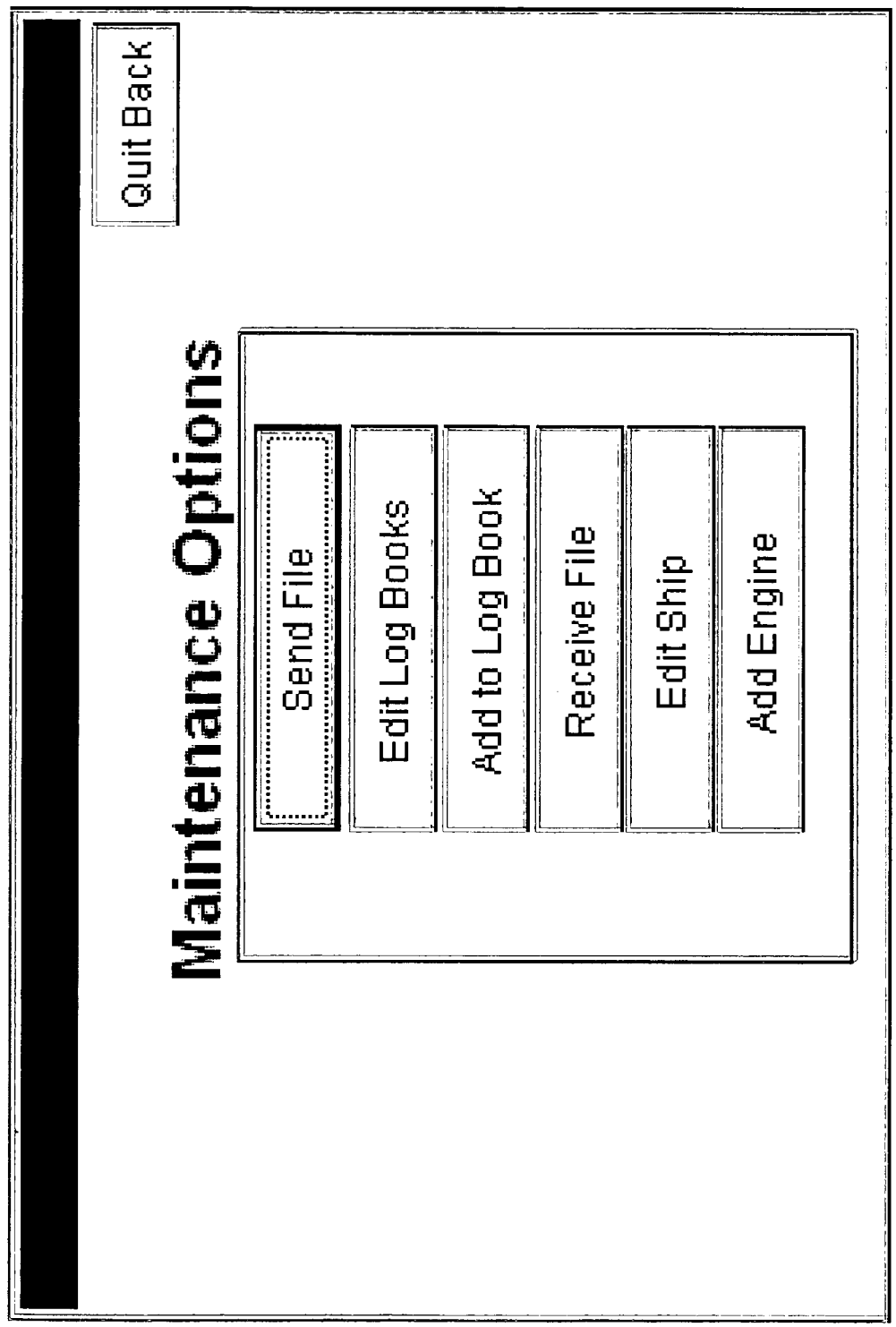
FIG. 2 is a pictorial representation, similar to that described by FIG. 1, of an inventive AUTOLOG program embodiment's Maintenance Options dialog box.

Editing and adding information specific to a logbook must be done at the Automated Logbook Form level for each Module and Engine so information will trickle down to all of the associated tables. Similarly, information that is imported into or exported from the database is also done at the Automated Logbook Form level. It is done at this level because the import and export procedures are only implemented for entire database export and import, backup procedures, and engine import. Due to these constraints, maintenance options are available by clicking on the "Maintenance" button on the bottom left-hand corner of the Automated Logbook Form shown in FIG. 1. Clicking on the Maintenance button will open the Maintenance Options dialog box. With reference to FIG. 2, the Maintenance Options dialog box contains six buttons by which all features described above are executed.

3.1. Send File Option

Clicking on the "Send File" button opens an external File Transfer Protocol (FTP) program that performs an upload of the user specified file to an FTP site. AUTOLOG allows the user to create a text file containing user added or modified data. To create an export file, the user must, in order: (1) click "Maintenance" button on the main form; (2) click "Send file"; (3) click "Export file"; (4) type the exact location and name of the file he/she wants to be created; finally, (5) click "Export."

Step (3) starts the output.prg program that is responsible for obtaining the file name and location (Steps 4 and 5, above) and creating the export file. To avoid exporting of the same data multiple times, AUTOLOG stores the last export date (actually the day before the last export date) in the table exportdate.dbf. This date is updated if the user completes step (5) above and the file is successfully created, in which case AUTOLOG executes:

sele exportdate
replace exportdate.date with date( )-1

The actual exporting of records from all tables is done in the same manner: (1) create a temporary table containing user added or modified records for this table; (2) write the header for this table to the export file; (3) go through all records in the temporary table; (4) parse and assign them to a string variable and then write that created string into the export file. A code example is set forth in FIG. 2a and FIG. 2b. The user is notified via a message box when download is complete.

3.2. Edit Log Books Option

Figure 3:
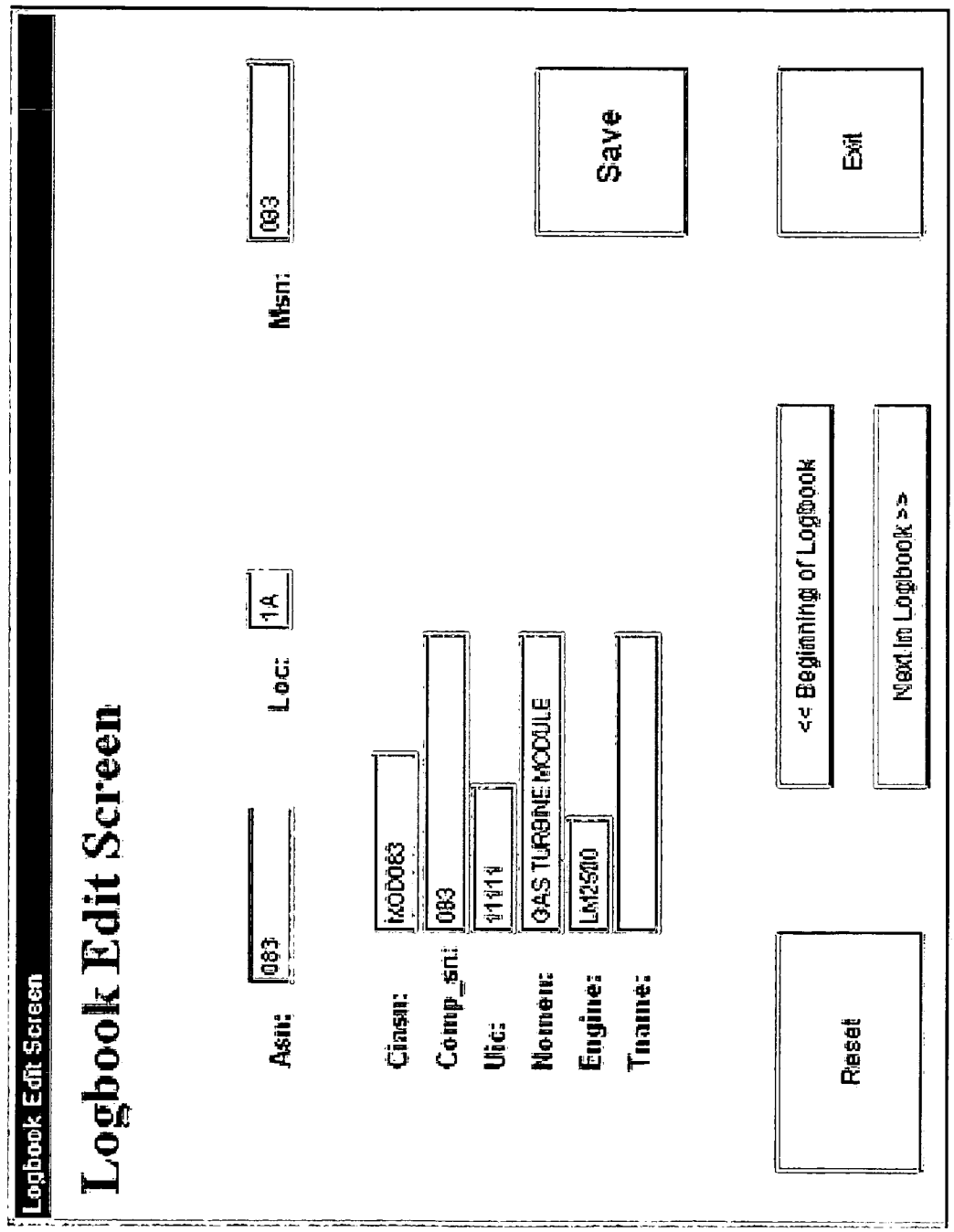
FIG. 3 is a pictorial representation, similar to that described by FIG. 1, of an inventive AUTOLOG program embodiment's Logbook Edit Screen.

With reference to FIG. 3, clicking on the "Edit Log Books" button opens the "Logbook Edit Screen." The screen opens and displays the values for the first Logbook listed in the "Pick a Log Book" dropdown box from the Automated Logbook Form. Navigation through the current Log Books is conducted by clicking on the "Next" button to view the next Log Book (from top to bottom) in the aforementioned dropdown on the Automated Logbook Form. The Logbook Edit Screen allows the user to change information with regard to each Log Book.

Users are permitted to change the "Asn", "Loc" and "Msn" text boxes. These fields update to the comptp12 table to fields asn, loc and msn respectively. Also, when the Asn value changes, the Ciasn value will change to the current ci from the comptp12 table concatenated with the newly changed asn value. If the Log Book is for an engine, the comp_sn will also be updated to the new Asn value. Read-only text boxes ("Ciasn", "Comp_sn", "Uic", "Nomen", "Engine" and "Tname" are all populated from the current field of the Comptp12 table of the same name. The "Save" button saves changes made to the current Log Book, the "Reset" button resets the form to the original values for the current Log Book, and the "Exit" button closes the Logbook Edit Screen form.

3.3. Add to Log Book Option

Figure 4:
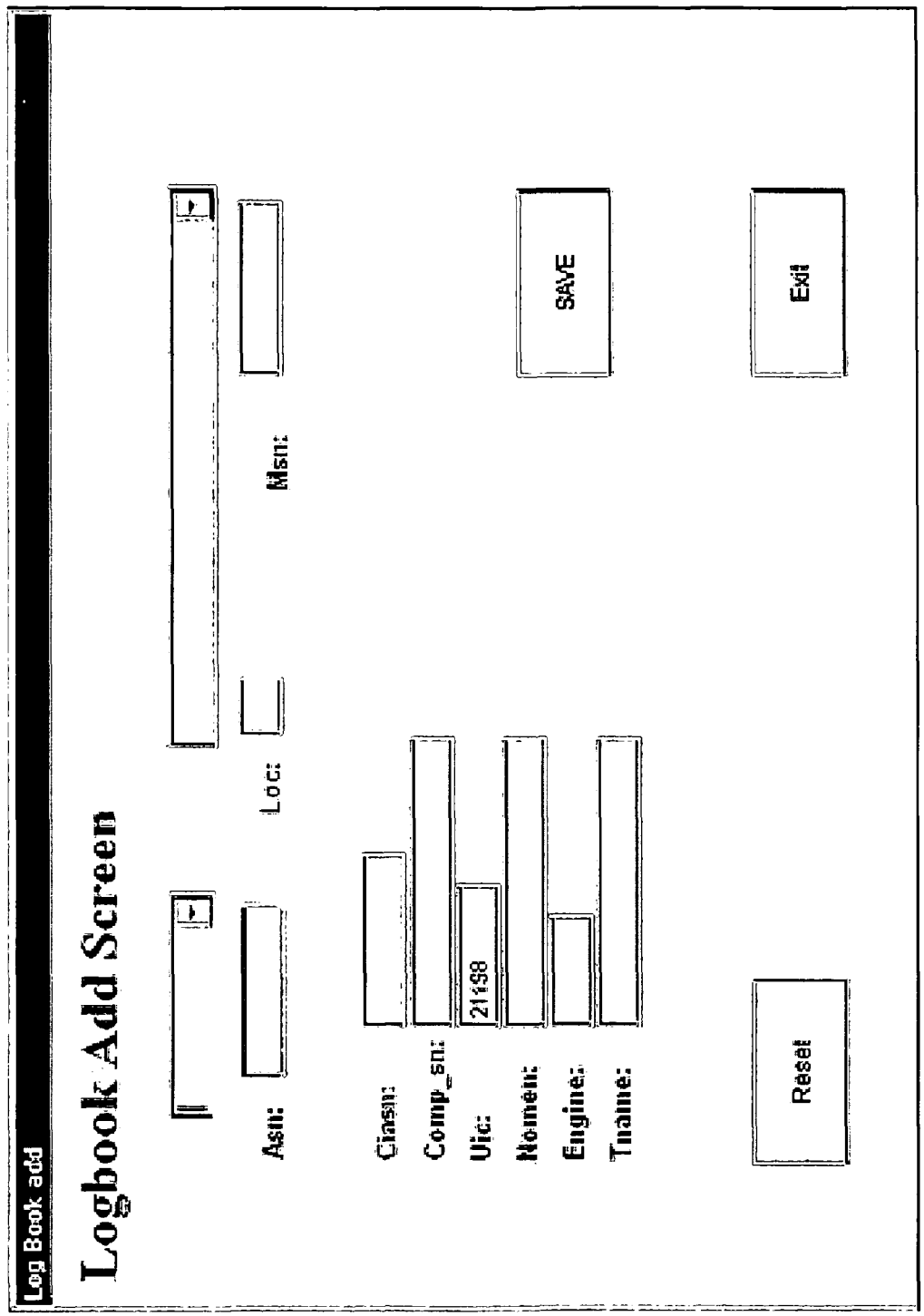
FIG. 4 is a pictorial representation, similar to that described by FIG. 1, of an inventive AUTOLOG program embodiment's Logbook Add Screen.

With reference to FIG. 4, clicking on the "Add to Log Book" button opens the Logbook Add Screen. The fields are the same as for the "Edit Log Book" Screen (see 3.2. Edit Log Books Option) with the exception of two dropdown boxes for ci (populated with the ci field from the citemp table) and the corresponding tan selection (populated with fields tan, tname, tan_class and engine from the temptan table). The tan dropdown box is directly linked to the ci dropdown, and as such, ci must be chosen before the tan dropdown is populated.

After a tan is chosen, the fields (tan_record, tname, nomen, engine, tan_class, comp_type, icmc, tan, main_recor, main_record, uic and ciasn) are populated in the comptp12 table and their corresponding text boxes (if they are represented on the form) are updated to reflect their values. An asn must also be entered before saving the Log Book, it will populate both the asn and comp_sn fields of the comptp12 table and their corresponding text boxes on the form. The "Save" button saves changes made to the newly added Log Book, the "Reset" button resets the form, and the "Exit" button closes the "Logbook Add Screen" form.

3.4. Receive File Option

Clicking on the "Receive File" button opens an external Receive AUTOLOG Files program that performs a download of a user specified file from an FTP site.

The import program allows the user to append data from any delimited ASCII file into a predefined AUTOLOG database file. The intent is to read in memo field data, but the program will also address files with varying delimiters. This program assumes that the target database file is currently in use, used exclusively, and in the current work area.

To create an import file, the user must complete these steps in order: (1) click "Maintenance" button on the main form; (2) click "Receive file"; (3) click "Import file"; (4) type the exact location and name of the file he/she wants to be imported; finally, (5) click "Import."

If the user completes step (5) above and the file is available to read, the AUTOLOG executes the import.prg program which is responsible for deleting data currently in database tables, reading data from import file and writing it to the tables.

The actual importing of records is done in the following manner:

(1) Deleting existing records from database tables:
use comptp12 exclusive
delete from comptp12
pack
(2) Lists tables data could be imported into:
IF CurrentTable="Comptp6" or CurrentTable="Rework" or CurrentTable="Transfer" or CurrentTable="Inspect" or CurrentTable="Ecptd Inst" or CurrentTable="Mischist" or CurrentTable="Eng_Components" or CurrentTable="Eng_0 phours" or CurrentTable="Comptp3" or CurrentTable="Comptp12" or CurrentTable="Main Location" or CurrentTable="Servrec" or CurrentTable="Comptp7" or CurrentTable="Comptp7da"

Reference is now made to FIG. 4a, which illustrates the reading of records from the import file and the appending of them to an appropriate table.

After finishing the import of the data, the import.prg exits and a message box notifies the user that the user must restart the AUTOLOG program, allowing the database to close and release all forms.

3.5. Edit Ship Option

Figure 5:
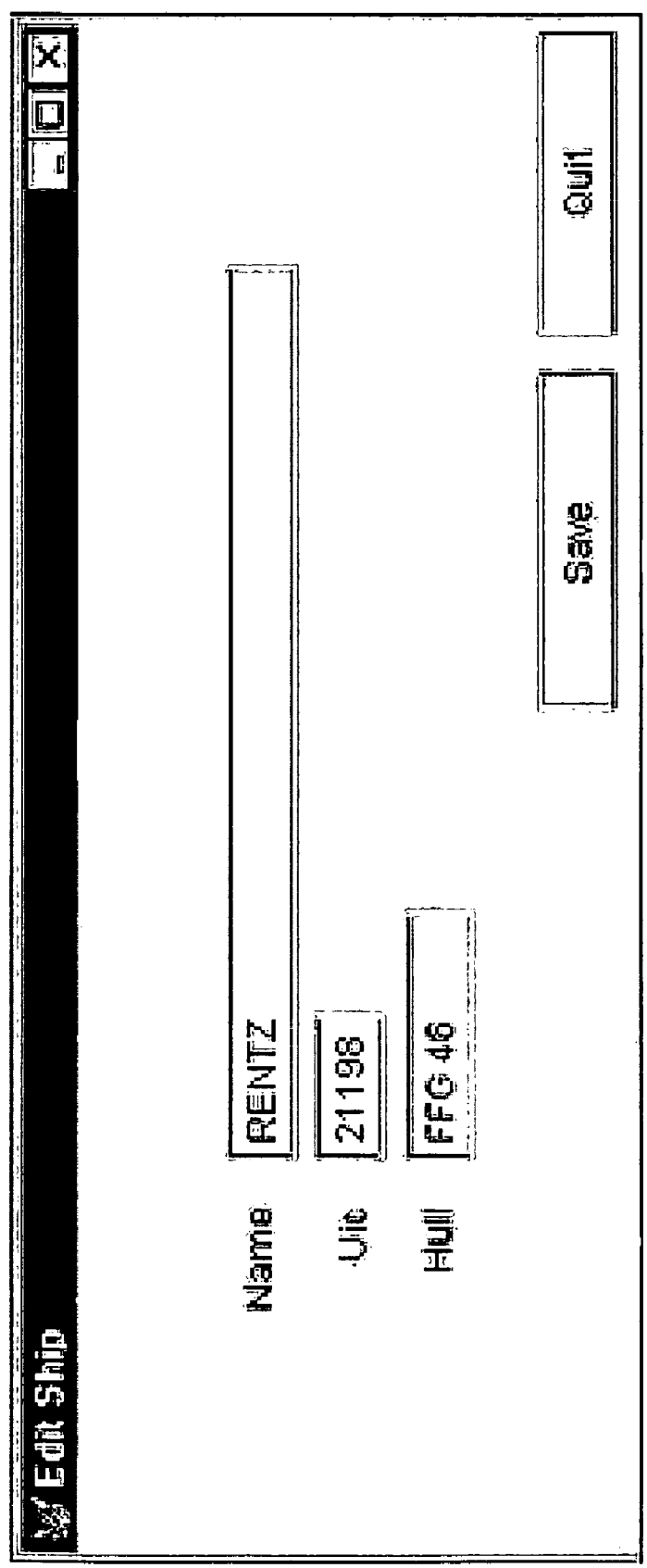
FIG. 5 is a pictorial representation, similar to that described by FIG. 1, of an inventive AUTOLOG program embodiment's Edit Ship dialog box.

With reference to FIG. 5, clicking on the "Edit Ship" button opens the "Edit Ship" dialog box. Here the user can change the name, uic, and hull that appear on the Automated Logbook form (See 1.0. Main Form; FIG. 1) and are stored in the main_location table.

3.6. Add Engine Option

Figure 6:
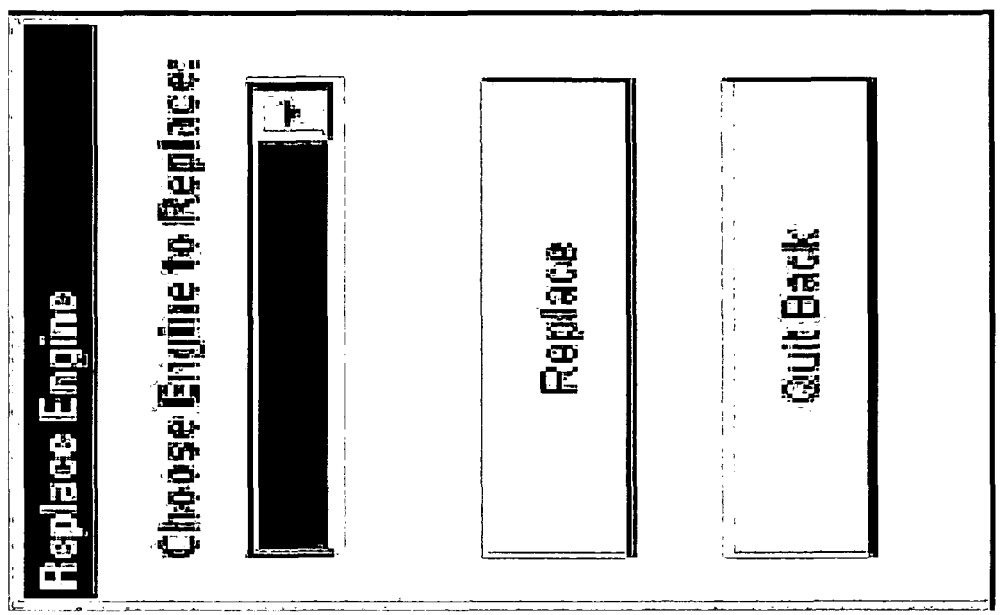
FIG. 6 is a pictorial representation, similar to that described by FIG. 1, of an inventive AUTOLOG program embodiment's Replace Engine dialog box.

With reference to FIG. 6, clicking on the "Add Engine" button opens a "Replace Engine" dialog box. Using the dropdown box, the user must select an engine to replace, and then click on the "Replace" button. Clicking on the "Replace" button, prompts the user to verify they have a file to import, and gives them a chance to cancel. If they choose to continue, they are shown a file selection dialog box to choose their engine import file. After a file is chosen the import takes place.

The Import Engine (engimportexp.prg) program allows users to replace existing engines as well as the data for them with information for a new engine and its associated records. In order to do so, the program deletes all the records for the selected engine to be replaced and appends data for the new engine into a predefined AUTOLOG database file. The data for the new engine is contained in a delimited ASCII file specified by the user. This is the same as the Import.prg program.

Once the user hits the "Import" button, the program checks for the existence of the file chosen by the user, and if it exists it executes the engimportexp.prg program. The engimportexp.prg program is responsible for deleting data currently in the database tables for the old engine the user has selected to replace, then reading the data from the import file and putting it in the database. After finishing the importing of the data, the engimportexp.prg program exits and creates a message box informing the user that they must restart the AUTOLOG program to allow the database to close and release all forms.

The actual importing of records from the Oracle database, as well as the parsing and creation of import files (whether for an engine or a ship), is performed by PERL programs.

3.7. Generating Backups

AUTOLOG allows the user to create a text backup file containing all of the AUTOLOG data. To create a backup file the user should, in order: (1) click the "Maintenance" button on the main form; (2) click "Send File"; (3) click "Make Backup File"; (4) type the location and name of the file that he/she wants the backup data written to; finally, (5) click "Export."

Step (3) starts the bupout.prg program, which is very similar in form to the output.prg program used for export of user entered/modified data. The output of the bupout.prg file is formatted so it can be imported straight back into AUTOLOG, while the output.prg file is formatted for PERL scripts for importing into the Oracle database. The importing of backed-up data is performed by the import.prg program. These two programs are shown in txt format, designated "autolog.bupout.prg" and "autolog.import.prg," respectively, in the Computer Program Listing Appendix.

4.0. Generating Reports

Figure 7:
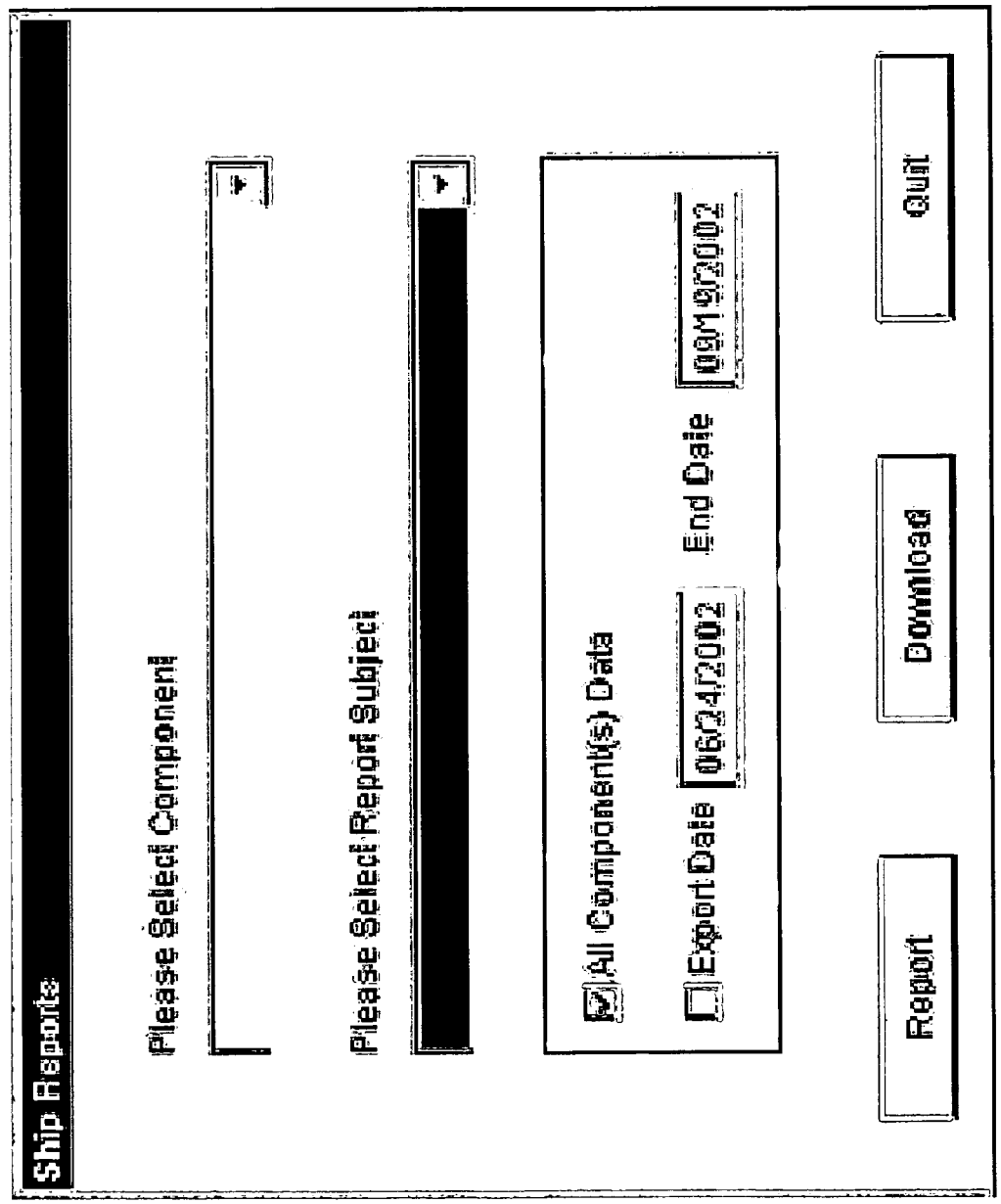
FIG. 7 is a pictorial representation, similar to that described by FIG. 1, of an inventive AUTOLOG program embodiment's Ship Reports dialog box.

Reports are generated for data stored within the AUTOLOG program by clicking on the "Reports" button located to the right of the "Maintenance" button on the bottom of the Automated Logbook form shown in FIG. 1. With reference to FIG. 7, clicking on the Reports button opens the "Ship Reports" dialog box.

Prior to generating the report, the user must select a Module or Engine from the "Please Select Component" dropdown box, then choose a report subject from the "Please Select Report Subject" dropdown box, and finally select either the "All Component(s) Data" option or a date range. Table 1, above, provides a listing of Report Subjects and associated FoxPro report files. Once these steps are taken, the report may be either shown in Print Preview by clicking the "Report" button, or saved to a file by clicking the "Download" button.

5.0. Editing Module and Engine Data

Figure 8:
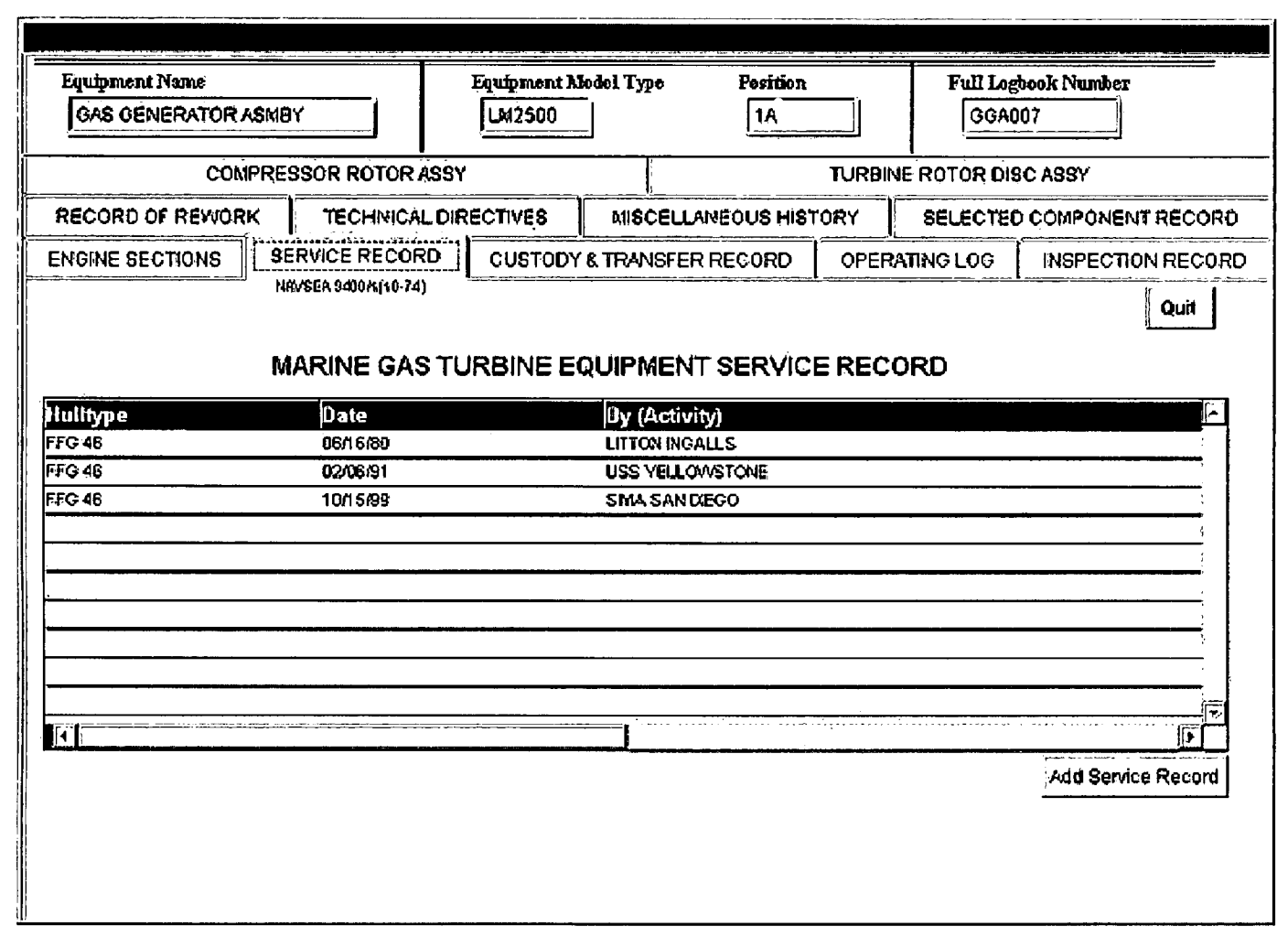

With reference to FIG. 8, the Module and Engine edit forms are reached by choosing a module or engine and clicking "GO" on the Automated Logbook form shown in FIG. 1. These edit forms are also used to edit data associated with each module or engine (remember module and engine serial numbers, and tans are set on one of the Logbook Edit forms (See 3.2. Edit Log Books Option; 3.3. Add to Log Book Option). Data associated with a module is grouped by type and listed separately under tabs (in a tabular section). As shown in FIG. 8, this controls the display portion of the bottom of the form.

As discussed hereinabove (See 3.0. Performing Maintenance), when the "GO" button is clicked, the section table is populated with the appropriate data from the comptp12 table for the selected module or engine. As such, the edit forms are based on this record from the section table and when the edit form opens the Module or Engine tab is the default selection displaying CI, Engine, Serial Number and Module information on the tab section of the form; these fields are read-only and update to the ci, engine, comp_sn, and msn or asn of the section table respectively.

Also, visible regardless of the tab selected on the bottom portion of the form are "Equipment Name," "Equipment Module Type," "Position" and "Full Logbook Number." These fields are across the top portion of the form and are read-only. They update to the nomen, engine, loc and ciasn fields of the section table, respectively. The remaining tabs on the Module edit form associate records from their respective table to the section table by each table's ciasn field.

5.1. Module/Engine Tabular Sections

Most tabs of the Edit Form display a section that consists of two controls. The only exception is the Operating Hours section, which is only available on the Engine edit form (See 5.1.1. Operating Log Tab). The first control is a scrolling grid that contains records from the table containing the data for that tab section. The second control is an "Add . . . Record" button (appropriately named for each section respectively). The grid is populated with data from the appropriate table for each respective section where records match by ciasn with the current record contained in the section table (See above in 5.0. Editing Module and Engine Data). Double clicking on any field of a record in the grid opens the edit form for that record and tab section. Similarly, clicking the "Add . . . Record" appends a blank record to the table for that section and then opens the appropriate edit form (See 5.2. Add and Edit Module/Engine Data Forms). Refer to Table 2, below, for descriptions of tabular sections, tables and field listings for their grids.

TABLE 1

| Report Subject | FoxPro Report File |
|---|---|
| Service Records | serv.frx |
| Inspection Records | inspection.frx |
| Rework Records | rework.frx |
| Technical Directives | technical.frx |
| Miscellaneous History Records | misc.frx |
| Selected (sub) Component Records | selectedcomp.frx |
| Custody and Transfer Records | transfer.frx |
| Operating Records | operating.frx |
| Compressor Rotor Records | compressor.frx |
| Turbine Rotor Records | turbine.frx |
| Abnormal Temperature and/or Overseed Data | Turbine_abn.frx |

TABLE 2

| Tabular Title | Table | Grid Field Titles | Table Fields to Grid Titles |
|---|---|---|---|
| Service Record | Servrec | Hull Type | hulltype |
| | | Date | ycompinstd |
| | | By (Activity) | by |
| Inspection Record | Ins | Special Conditions | sp |
| | | Authority | au |
| | | Date Commenced | dtcm |

TABLE 2-continued

| Tabular Title | Table | Grid Field Titles | Table Fields to Grid Titles |
|---|---|---|---|
| | | Date Completed | dtcp |
| | | Activity | activit |
| | | Verified By | signat |
| | | Type of Inspection | desc |
| | | TSN | tsn |
| | | Next Due | nextdue |
| Record of Rework | rework | Date Inducted | Ydt_ind |
| | | Date Completed | Ydt_comp |
| | | Description | Desc |
| | | Authorization | Authori |
| | | Activity | Activit |
| | | Verified By | Signat |
| Technical Directives | Tds | Type | Tp |
| | | TdNo | Nm |
| | | Title | Tt |
| | | Status | Status_cod |
| | | Category | Category_td |
| | | Activity | Activit |
| | | Install. Date | Dt |
| | | Verified By | Signat |
| Miscellaneous History | mischist | Date | Ydt_misc |
| | | Title or Reference | Remarks |
| Module Component Record Or Selected Components (For Engines) | comptp12 | Nomenclature | Nomen |
| | | Serial # | Comp_sn |
| | | Part Number | Prtnbr |
| | | Date Installed | Ydt_inst |
| | | Total Count (Installed) | Totcnti |
| | | Date Removed | Ydt_remov |
| | | Total Count (Removed) | Totcntr |
| | | Tsr | Tsr |
| Module Component Record Or Selected Components (For Engines) | comptp 12 | Tsn | Tottsnb |
| | | Ftc | Ftc |
| | | Pfp | Pfp |
| | | Fcc | Fcc |
| | | Notes | Notes |
| Custody & Transfer Record (Engine edit only) | transfer | Date of Transfer | ydt_trnsf |
| | | From | fromb |
| | | To | tob |
| | | Authority | authori |
| | | Date Received | ydt_recvd |
| | | Verified By | signat |
| Operating Log (Engine edit only) | eng_ophours | Mo/Year | Yophours_dt |
| | | Hours per month | Hrs_mo |
| | | Starts per month | Strt_mo |
| | | Remarks | Notes |
| Compressor Rotor Assy (Engine edit only) | comptp6 | Serial Number | Comp_sn |
| | | Location | Nomen |
| | | Date | Ycomp_instd |
| | | Stage No. | Stage |
| | | Hours Rotor/Shaft | Hoursrs |
| | | Hours Disk | Hoursd |
| | | Hours Blade | Hoursb |
| | | Activity | Iactivity |
| | | Verified By | Isignature |
| | | Date | Ydt_maint |
| | | Maintenance Notes | Notes |
| | | Activity | Mactivity |
| | | Verified By | Msignature |
| Turbine - Installation (Engine edit only) | comptp7da | Serial Number | Comp_sn |
| | | Location | Nomen |
| | | Date | Ycomp_inst |
| | | Hours Rotors | Hoursrs |
| | | Activity | Iactivit |
| | | Verified By | Isignat |
| Turbine - Abnormal Temperature and /or Overseed Data (Engine edit only) | comptp7 | Diameter | Diameter |
| | | Date | Adate |
| | | Engine hrs | Aenghrs |
| | | Rotor hrs | Arhrs |
| | | Temp/Speed | Atemps |
| | | Time Over Limit | Atimeo |
| | | Acause | Acause |

5.1.1. Operating Log Tab Section

The "Operating Log" section has a few added controls. They display an "Equipment Operation Summary" in the bottom right portion of the form. The "Equipment Operation Summary" consists of four read-only text boxes in a two column by two row grid. The column headings are "Operating Time" and "No. Starts," and the row headings are "Since New" and "Since Rework," The data displayed in the grid is calculated upon form activation. The logic for these calculations is show below in Listing 1.

LISTING 1

Query: Rew
select sum(eng.hrs_mo) as tot_hrsmo, sum(eng.strt_mo) as tot_strtmo
   from eng_ophours eng
   where eng.ciasn=section.ciasn .and. testcell="R"
Query: New
select sum(eng.hrs_mo) as tot_hrsmo, sum(eng.strt_mo) as tot_strtmo
   from eng_ophours eng
   where eng.ciasn=section.ciasn .and. testcell< >"T"
Query: Tot
select sum(eng.tempsnhrs) as temphrs, sum(eng.tempsnstrt) as tempstrt,
   sum(eng.temprwhrs) as temprhrs, sum(eng.temprestrt) as temprstrt
from eng_ophours eng
where eng.ciasn=section.ciasn
Since New/Operating Time=New.tot_hrsmo+Tot.temphrs
Since New/No. Starts=New.tot_strtmo+Tottempstrt
Since Rework/Operating Time=Rew.tot_hrsmo+Tot.temprhrs
Since Rework/No. Starts=Rew.tot_strtmo+Tot.temprstrt 5.2. Add and Edit Module/Engine Data Forms After clicking on the "Add . . . Record" button or double clicking on a record in a grid in a tabular section, an appropriate edit form opens to allow the user to either add a new record or edit an existing record. Across the top of each form are Equipment Name, Equipment Module Type, Position and Full Logbook Number. These fields are read-only and load from the nomen, engine, loc and ciasn fields of the section table respectively. Note that these are a mirror of the fields present on the Module and Engine edit forms. Also on each form, there is a drop-down box labeled "Mark for Deletion" populated with options "OK" and "DEL," and updates to the mdel field of the forms respective update table. Note that when exiting the AUTOLOG, all records that have a "DEL" value in the mdel field are deleted from their respective tables in the database.

All add and edit forms share similar steps. The Init( ) method for a form checks whether it is adding or editing a record. If it is editing a record it displays the previous non-user entered data into the form blanks. If adding, it only fills in the known data for an engine/module the user is working on (from the section.dbf table, as discussed herein in 5.0. Editing Module and Engine Data). FIG. 8*a* illustrates an example from the Inspection form.

Each form has a set of required data fields the user must enter. If the user does not fill out all the required forms and tries to save the record a message box appears alerting the user that he/she must enter that data. A list of the required fields is provided in FIG. 8*b*.

5.2.1. Add/Edit Service Record Form

With reference to FIG. 9, Adding and Editing a Service Record is performed using the "Edit the Service Record" form. In addition to the standard four read-only boxes on Add/Edit forms, the Edit Service Record form has a read-only textbox loaded from the hulltype field of the servrec table that displays the current "Hull Type" of the logbook. It also has four text boxes for data entry labeled "Installation Date", "By (Activity)", "Verified By" and "Notes", which updates to ycomp_instd, by, signature and notes fields respectively in the servrec table.

There are three buttons on the form labeled "Add", "Undo" and "Cancel". Clicking on the "Save" button executes code that checks for a valid "Installation Date", for a "By (Activity)" value, and for a "Verified By" field. If any of these checks fail, the user is notified that he/she must enter valid data for the respective field. If all of the checks pass, changes to the fields on the form are updated to the servrec table and the form closes. Clicking on the "Undo" button executes code that resets the form to its original state and refreshes the form. Clicking on the "Cancel" button sets the form to its original state and closes the form.

5.2.2. Add/Edit Custody and Transfer Record Form

With reference to FIG. 10, Adding and Editing a Transfer Record is done using the "Add Custody and Transfer Record" form. The form has one read-only text box labeled "Serial Number" loaded from the ciasn field of the transfer table, and three read-only textboxes per "From" and "To" location drop-down box. The "From" and "To" dropdown boxes are populated during form initialization from a recordset containing the fields name, uic, shipdepo and main_reco from the mloc table (although only the name field is visible in the dropdown). Upon clicking on the "From" dropdown box, the three read-only fields directly above are populated with the name, uic and shipdepo values from left to right. The left-most read-only text box and the dropdown box selection update to the fromb and mrec_from (using the main_reco value) fields, respectively, of the transfer table. The editable text box fields on the form are labeled "Date," "Verified Date," "Authority," "Verified By," "Cause" and "Memorandum or Narrative." These editable fields update to the ydt_trnsf, ydt_recvd, authori, signal, remv_reason and tremarks of the transfer table, respectively. Also, there is a third dropdown box labeled "Cause" which is populated from a recordset (query: select rc.reason from itemsaera rc where rc.tan_record=section.tan_record order by rc.reason) and updates to the remv_reason of the transfer table.

There are three buttons on the form; they are labeled "Add," "Undo" and "Cancel." Clicking on the "Save" button executes code that checks for a valid "Date," for a "To" selection, an "Authority," and a "Verified By." If any of these checks fail, the user is notified that he/she must enter valid data for the respective field. If the checks all pass, changes to the fields on the form are updated to the transfer table and the form closes. Clicking on the "Undo" button executes code that resets the form to its original state and refreshes the form. Clicking on the "Cancel" button sets the form to its original state and closes the form.

5.2.3. Add/Edit Inspection Record Form

Figure 11:
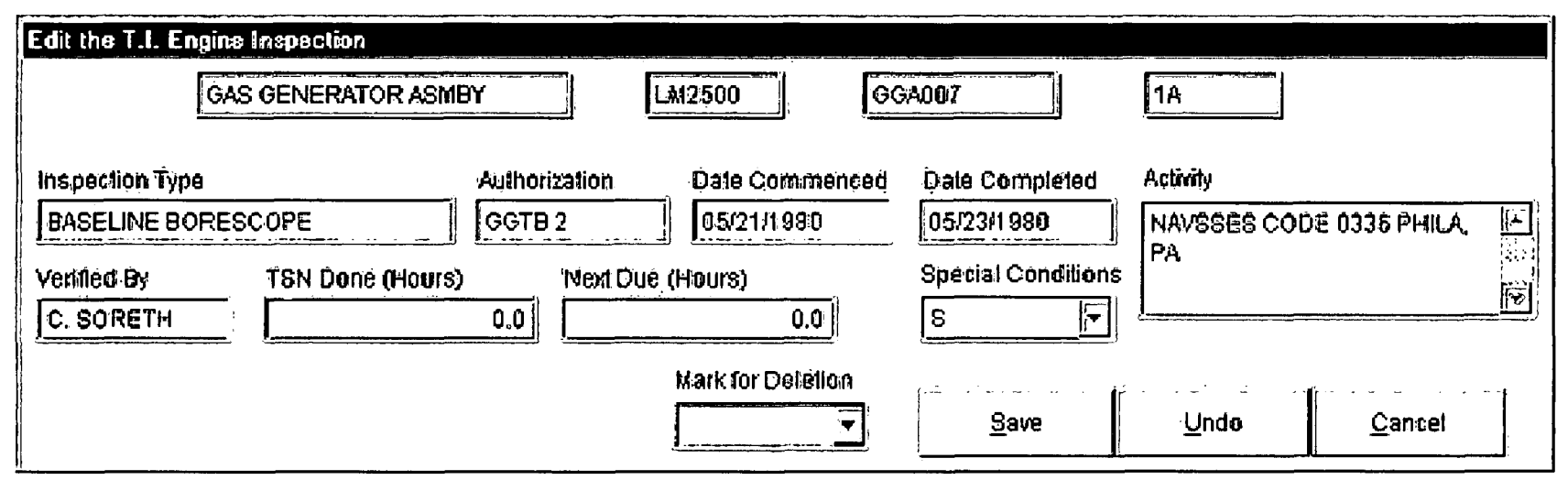

With reference to FIG. 11, Adding and Editing an Inspection Record is done using the "Edit the T.I. Engine Inspection" form. It has eight text boxes for data entry, and they are labeled "Inspection Type," "Authorization," "Date Commenced," "Date Completed," "Activity," "Verified By," "TSN Done (Hours)" and "Next Due (Hours)." These text boxes update to the desc, authori, ydt_comm, ydt_comp, activit, signal, tsn, and nextdue fields, respectively, in the inspect table. Also, there is a dropdown box labeled "Special Conditions" that is populated with thiscond, desc from the specialc table. When a selection is made from the "Special Conditions" dropdown box it is updated to the specond field of the inspect table.

There are three buttons on the form, labeled "Add," "Undo" and "Cancel." Clicking on the "Save" button executes code that checks for a valid "Completion Date," an "Inspection Type," an "Activity," a "Verified By" and for a "Special Condition" value. If any of these checks fail, the user is notified that he/she must enter valid data for the respective field. If the checks all pass, changes to the fields on the form are updated to the inspect table and the form closes. Clicking on the "Undo" button executes code that resets the form to its original state and refreshes the form. Clicking on the "Cancel" button sets the form to its original state and closes the form.

5.2.4. Add/Edit Rework Record Form

Figure 12:
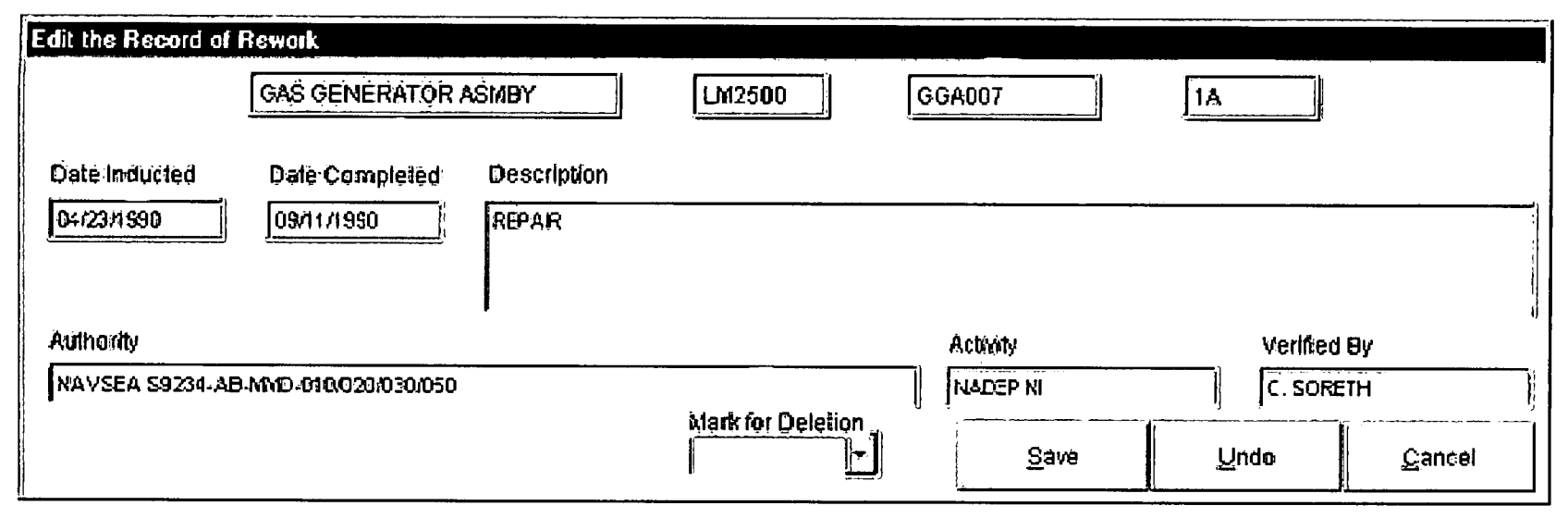

With reference to FIG. 12, Adding and Editing a Service Record is done using the "Edit the Record of Rework" form. It has six text boxes for data entry labeled "Date Inducted," "Date Completed," "Description," "Authority," "Activity" and "Verified By." These labels update to the ydt_ind, ydt_comp, desc, authori, activit, and signal fields, respectively, in the rework table.

There are three buttons on the form, labeled "Add," "Undo" and "Cancel." Clicking on the "Save" button executes code that updates changes to the fields on the form to the rework table, and the form closes. Clicking on the "Undo" button executes code that resets the form to its original state and refreshes the form. Clicking on the "Cancel" button sets the form to its original state and closes the form.

5.2.5. Add/Edit Miscellaneous History Form

Figure 13:
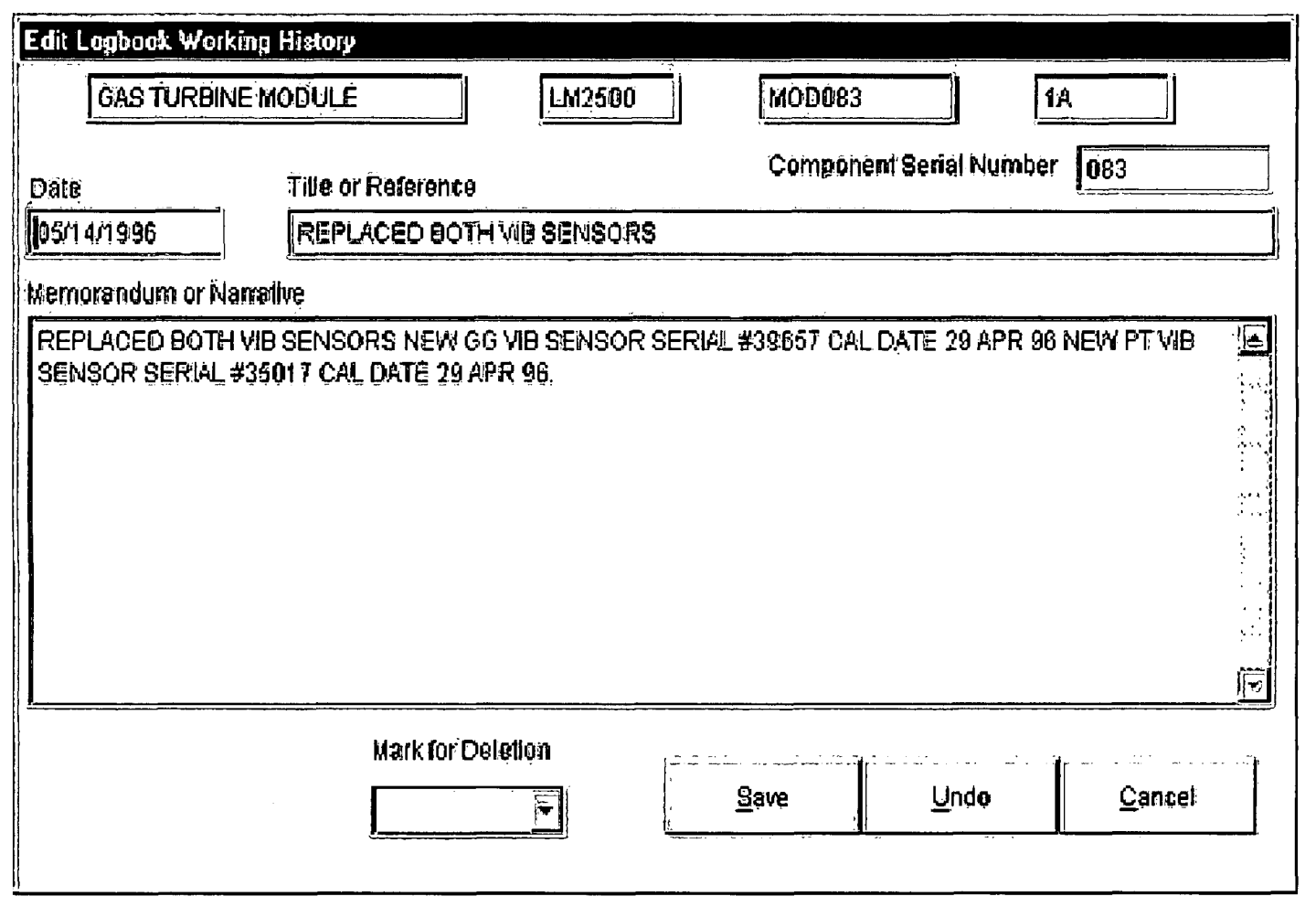

With reference to FIG. 13, Adding and Editing a Miscellaneous History Record is performed using the "Edit Logbook Working History" form. In addition to the standard four read-only boxes on Add/Edit forms, the "Edit Miscellaneous History" form has a read-only textbox labeled "Component Serial Number" (CSN). The CSN is loaded from the comp_sn field of the mischist table. It also has three text boxes for data entry labeled "Date." "Title or Reference" and "Memorandum or Narrative" which update to the ydt_misc, remarks and mremarks fields respectively in the mischist table.

There are three buttons on the form, labeled "Add," "Undo" and "Cancel." Clicking on the "Save" button executes code that checks for a valid "Title or Reference" entry. If this check fails, the user is notified that he/she must enter valid data for the field. If the check passes, changes to the fields on the form are updated to the mischist table and the form closes. Clicking on the "Undo" button executes code that resets the form to its original state and refreshes the form. Clicking on the "Cancel" button sets the form to its original state and closes the form.

5.2.6. Add/Edit Technical Directives Form

Figure 14:
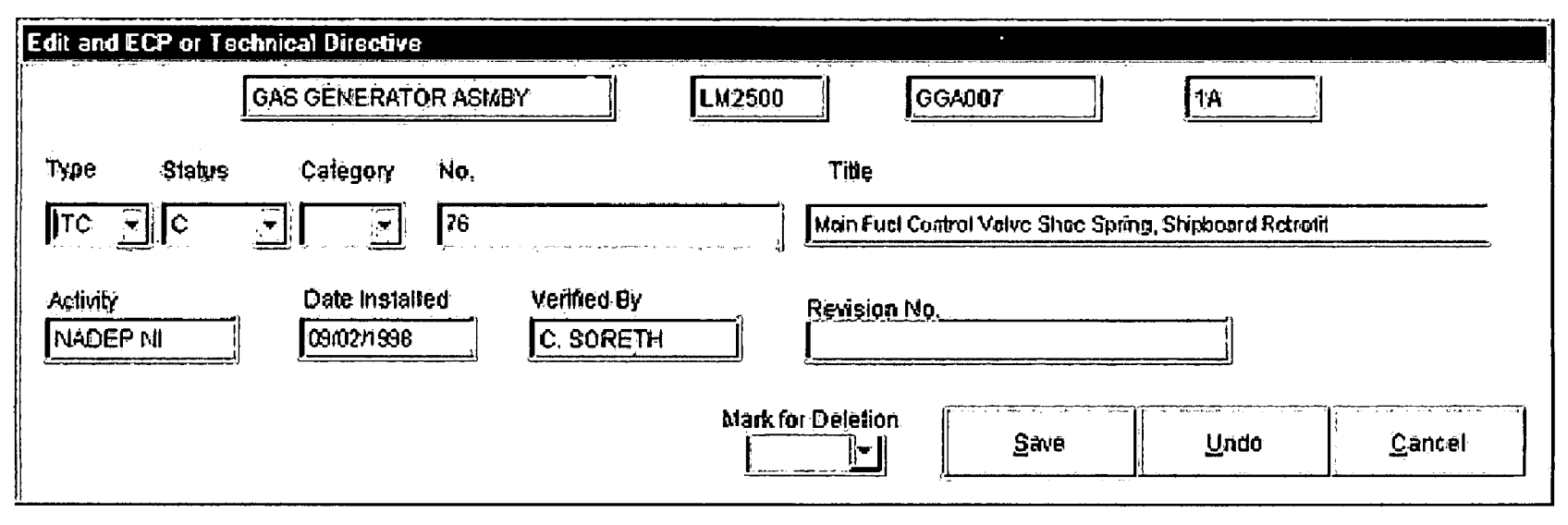

With reference to FIG. 14, Adding and Editing a Technical Directive Record is accomplished using the "Edit Technical Directive" form. It has six text boxes for data entry labeled "No.," "Title," "Activity," "Date Installed," "Verified By" and "Revision No." The text boxes update to the numtd, title, activit, ydate_inst, signal and rev fields, respectively, in the ecptd_inst table. Also, there are three dropdown boxes labeled "Type," "Status," and "Category" that are updated to the type, status_cod and categorytd fields, respectively, in the ecptd_inst table. The "Type" dropdown is populated with options (AYC, AYB, ECP, GTC, GTB, IAC, ITC); the "Status" dropdown is populated with options (C, INC, NA, NINC, NIS); and, the "Category" dropdown is populated with options (R, U).

There are three buttons on the form, labeled "Add," "Undo" and "Cancel." Clicking on the "Save" button executes code that checks for a valid "Date Installed," a TD "No.," a "Title," an "Activity," a "Verified By," a "Type" selection, a "Status" selection and a "Category" selection. If any of these checks fail, the user is notified that he/she must enter valid data for the respective field. If the checks all pass, changes to the fields on the form are updated to the ecptd_inst table, and the form closes. Clicking on the "Undo" button executes code that resets the form to its original state and refreshes the form. Clicking on the "Cancel" button sets the form to its original state and closes the form.

TABLE 3

| CI  | Cascading CI |
|-----|--------------|
| GPM | CTM          |
|     | IHM          |
| CTM | GPM          |
|     | IHM          |
| GGA | PTA          |
| PTA | GGA          |
| GTA | HOT          |
| HOT | GTA          |
| MOD | MOD          |

With reference to the above Table 3, if "Yes" is selected in the "Add to All?" dropdown box, then changes to the current TD (for all fields but "Revision No" for adding and for fields "Status," "Activity," "Date Installed" for editing) are cascaded to engines of the same type for that TD by matching the first three digits of the ciasn (or ci) value using Table 3. These companion assembly update processes are spelled out in more detail hereinbelow.

5.2.6.1. Adding a Technical Directive

Besides adding technical directives (TD) to an engine entry, the user may choose to have the TD carry over to other engines. When the user chooses to carry over the data, then the TD is applied to other engines that satisfy the criteria set forth in the following paragraph.

TABLE 4

| Associated CIs | |
|---|---|
| CI  | Cascading to CI |
| GPM | CTM |
|     | IHM |
| CTM | GPM |
|     | IHM |
| IHM | CTM |
|     | GPM |
| GGA | PTA |
| PTA | GGA |
| GTA | HOT |
| HOT | GTA |
| MOD | MOD |

Firstly, it is required that the engines be the same type. For example, TD's for LM2500 engines are only applied to other LM2500's, not to 501K's. Secondly, with reference to the above Table 4, it is required that the engines have the same or associated CI's. For example, a new TD input for a GGA would create a new TD record for all GGA's and all PTA's on a ship. The list of associated CIs is contained in Table 4.

5.2.6.2. Modifying a Technical Directive

When modifying a TD, the user may choose to have the modification carried over to other engines. The other engines the modification is carried over to must satisfy the same two requirements as listed for adding a TD above, viz., (i) the engines are the same type, and (ii) the engines have the same or associated CI's. In addition, third and fourth requirements must be satisfied. Thirdly, it is required that the engine be in the same location. For instance, a modification done to a TD for an engine in position 1A carries over to the other engine in position 1A. Fourthly, it is required that the two engines already share the same TD (e.g., the companion unit shows a TD with the same TD Number and TD type).

If these requirements are not met or the user does not select to have the modifications carried over, then the modification only applies to the current engine.

5.2.6.3. Code Implementation

With reference to FIG. 14*a* and FIG. 14*b*, if the user selects the carry-over option, then the first operation done is to assign the Associated CIs to variables:

if substr(section.ciasn,1,3)="CTM"
    have_ci="CTM"
    addto_ci="IHM"
    or_ci="GPM"
    endif Secondly, the CIASN's for those engine records added to (or modified) get selected into an array.

Referring to FIG. 14*c*, procedures addtd( ), edittd( ) already "know" which engine a record should be added to or modified. Its CIASN is stored to the nxt_ciasn variable from the example shown in FIG. 14*a* and FIG. 14*b*.

If the user does not select to carry over changes, then additions or modifications only apply to the engine the user is currently working on.

5.2.7. Add/Edit Selected Component Record Form

Figure 15:
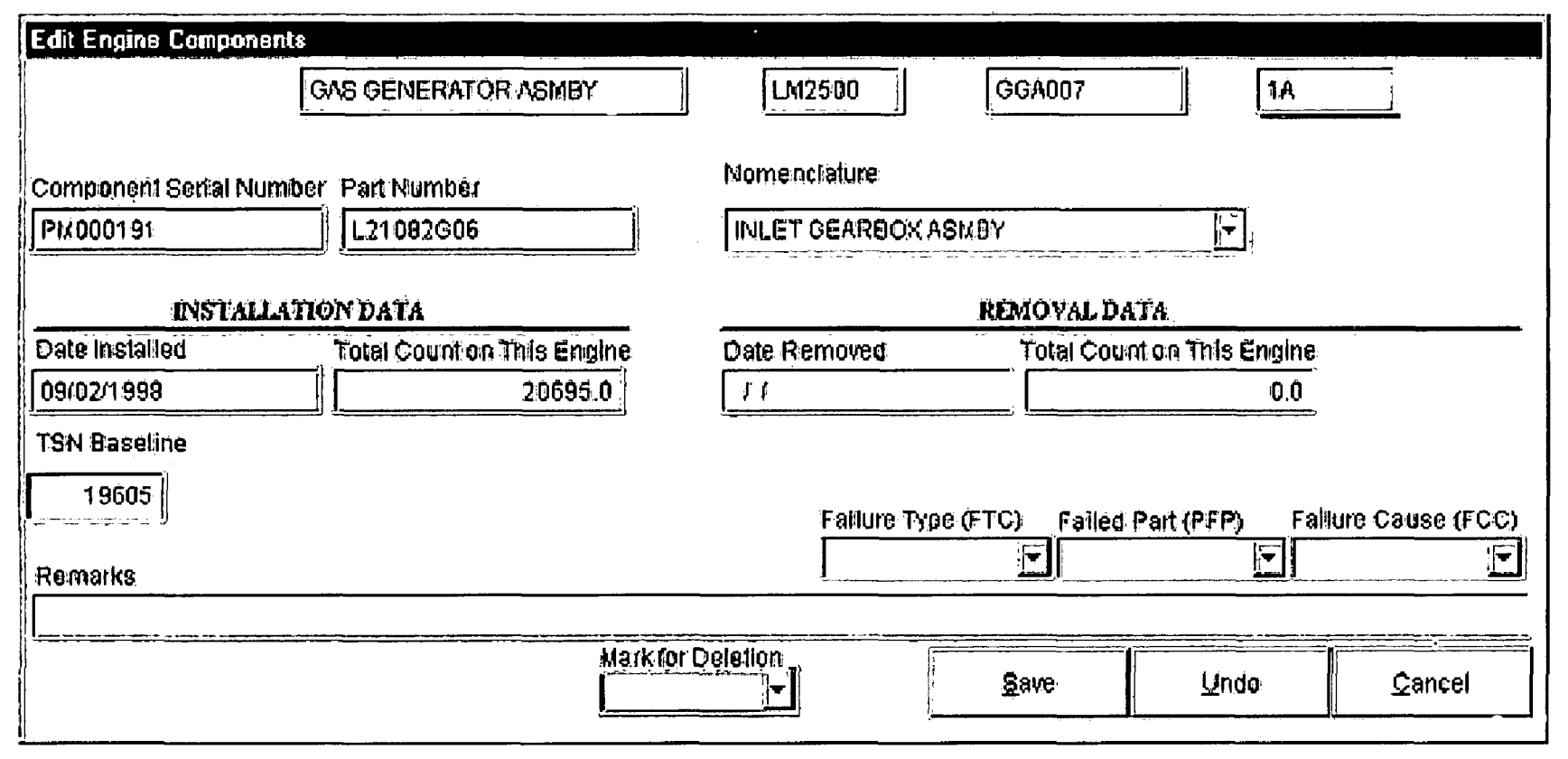

With reference to FIG. 15, Adding and Editing a Component Record is performed using the "Edit Engine Components" form. It has eight text boxes for data entry, labeled "Component Serial Number," "Part Number," "Date Installed," "Total Count on This Engine" (under "Installation Data" label), "Date Removed," "Total Count on This Engine" (under "Removal Data" label), "TSN Baseline" and "Remarks," which update to the comp_sn, prtnbr, ydt_inst, totcnti, ydt_remov, totcntr, tsnb and notes fields, respectively, in the comptp3 table.

There are also four dropdown boxes, labeled "Nomenclature," "Failure Type (FTC)," "Failed Part (PFP)" and "Failure Cause (FCC)," that update to the nomen, ftc, pfp and fcc. The "Nomenclature" dropdown box is populated with the tname field of the tn table which is created during form initialization and populated with information from the tan_master table that are of the engine type of the current logbook record (from the section table) and the appropriate comp_type (3 for engines and 4 for modules). When a record is selected in the "Nomenclature" dropdown box, it is not only updated to the nomen field as stated above, but program code is also executed to update the corresponding tan, tan_record and tan_class fields of the tn table to the comptp3 table. The "Failure Type (FTC)" dropdown box is populated with the ftc and described fields from the typeftc table. The "Failed Part (PFP)" dropdown box is populated with the pfp and described fields from the partpfp table. The "Failure Cause (FCC)" dropdown box is populated with the fcc and described fields from the causefcc table.

There are three buttons on the form, labeled "Add," "Undo" and "Cancel." Clicking on the "Save" button executes code that checks for a valid "Installation Date" and a "Nomenclature" selection; if a "Date Removed" is entered, fields "Total Count . . . " (removed), "FTC," "PFP" and "FCC" are checked for values. If any of these checks fail, the user is notified that he/she must enter valid data for the respective field. If the checks all pass, changes to the fields on the form are updated to the comptp3 table, and before the form closes calculations are performed and additional fields (tsn, tsr, ylast_updat, ycomp_instd, tottsnb) are updated.

Referring to the below Listing 2, wherein the logic for tsn and tottsnb is listed, ylast_update is set to the current date, tsr is set to the difference between totcntr and totcnti and ycomp_instd is set to ydt_inst. Clicking on the "Undo" button executes code that resets the form to its original state and refreshes the form. Clicking on the "Cancel" button sets the form to its original state and closes the form.

LISTING 2

IF totcntr=0 THEN
    tsn=totcnti
    ELSE
    tsn=totcnti+totcntr
    END IF
    IF totcntr=0 AND totcnti>=1 THEN
    tottsnb=tsnb
    ELSE IF totcnti=0 AND totcntr>=1 THEN

Figure 16:
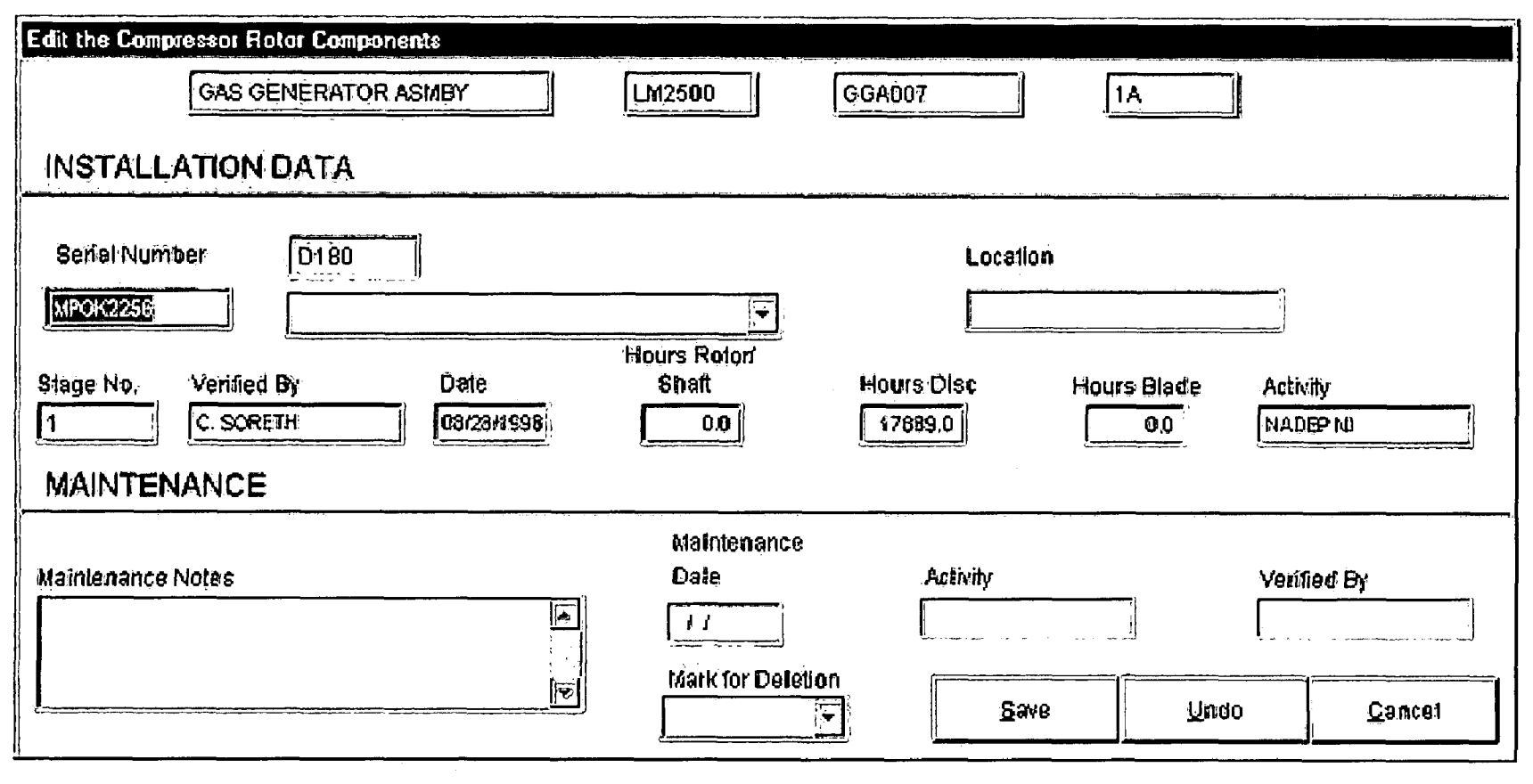

LISTING 2 tottsnb=tsnb
    END IF
    IF totcnti>=1 AND totcntr>=1 THEN
    tottsnb=tsnb+(totcntr−totcnti)
    END IF 5.2.8. Add/Edit Compressor Rotor Assembly Record Form With reference to FIG. 16, Adding and Editing a Edit Compressor Rotor Assembly Record is done using the "Edit the Compressor Rotor Components" form. In addition to the standard four read-only boxes on Add/Edit forms, the Edit Service Record form also has two read-only textboxes that are loaded with data during tan selection and represent information stored in the tan and tname fields of the comptp6 table. Tan selection is performed using the dropdown box next to the Serial Number text box. The tan selection drop-down box is populated during form initialization with fields tan, title1, tname and tan_record (from the tan_master) table where comp_type is equal to 5 or 6. When a record is selected in the dropdown box, program code is executed to update the corresponding tan, tname, nomen and tan_record fields of the selected record to the comptp6 table.

The "Edit the Compressor Rotor Components" form has twelve text boxes for data entry in two sections. Under the first section labeled "Installation Data" there are eight fields, labeled "Serial Number," "Stage No.," "Verified By," "Date," "Hours Rotor/Shaft," "Hours Disc," "Hours Blade" and "Activity," which update to the comp_sn, stage, isignature, ycomp_instd, hoursrs, hoursd, hoursb and iactivity fields, respectively, in the comptp6 table. Under the second section labeled "Maintenance" there are four fields, labeled "Maintenance Notes", "Maintenance Date", "Activity" and "Verified By," which update to the notes, ydt_maint, mactivity and msignature fields, respectively, in the comptp6 table.

There are three buttons on the form, labeled "Add," "Undo" and "Cancel," Clicking on the "Save" button executes code that checks for a "Serial Number" and for a tan selection. If either of these checks fails, the user is notified that he/she must enter valid data for the respective field. If the checks pass, changes to the fields on the form are updated to the comptp6 table and the form closes. Clicking on the "Undo" button executes code that resets the form to its original state and refreshes the form. Clicking on the "Cancel" button sets the form to its original state and closes the form.

5.2.9. Add/Edit Turbine Rotor Component (Installation) Record Form

Figure 17:
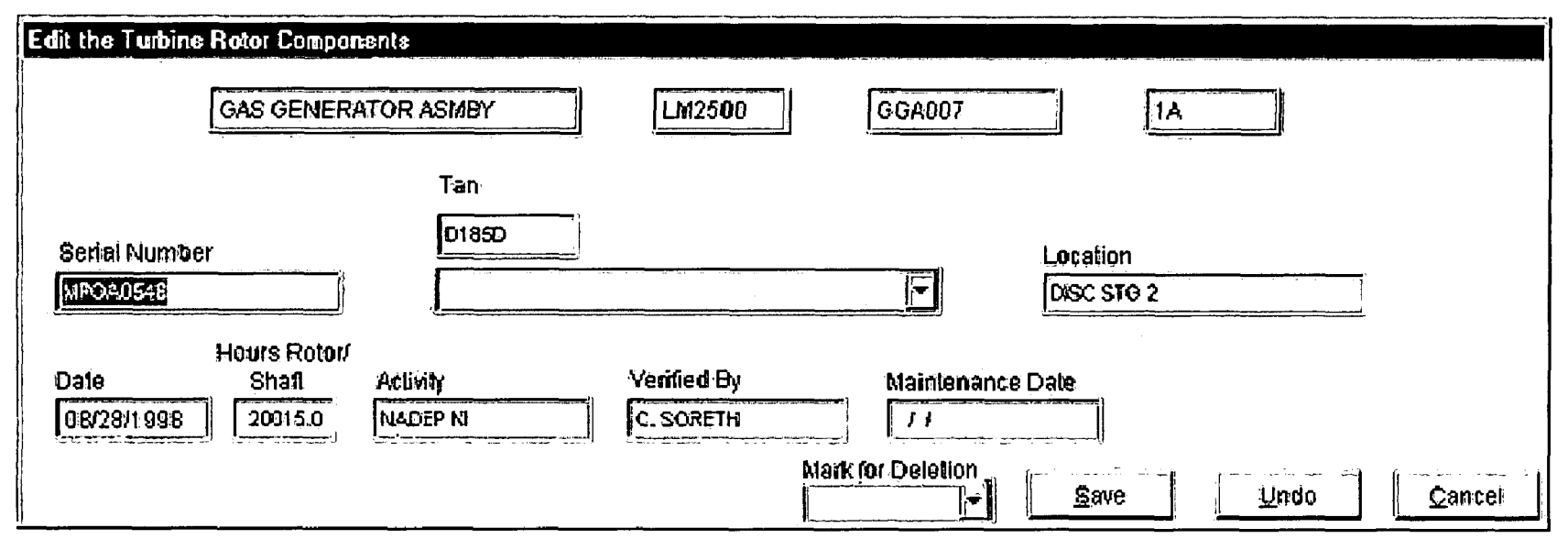

With reference to FIG. 17, Adding and Editing a Turbine Rotor Component Record is done using the "Edit the Turbine Rotor Components" form. In addition to the standard four read-only boxes on Add/Edit forms, the Edit Turbine Rotor Components form has two read-only textboxes that are loaded with data during tan selection and represent information stored in the tan and tname fields of the comptp7 table. Tan selection is performed using the drop-down box next to the Serial Number text box. The tan selection drop-down box is populated during form initialization with fields tan, title1, tname and tan_record from the tan_master table where comp_type is equal to 5 or 6. When a record is selected in the drop-down box, program code is executed to update the corresponding tan, tname, nomen and tan_record fields of the selected record to the comptp7 table.

There are six text boxes for data entry, labeled "Serial Number," "Date," "Hours Rotor/Shaft," "Activity," "Verified By" and "Maintenance Date." They update to the comp_sn, ycomp_inst, hoursrs, iactivity, isignature and ydt_maint fields, respectively, in the comptp7 table. There are three buttons on the form, labeled "Add," "Undo" and "Cancel." Clicking on the "Save" button executes code that checks for a "Serial Number" and for a tan selection. If either of these checks fails, the user is notified that he/she must enter valid data for the respective field. If the checks pass, changes to the fields on the form are updated to the comptp7 table and the form closes. Clicking on the "Undo" button executes code that resets the form to its original state and refreshes the form. Clicking on the "Cancel" button sets the form to its original state and closes the form.

5.2.10. Add/Edit Abnormal Temp Data Form

Figure 18:
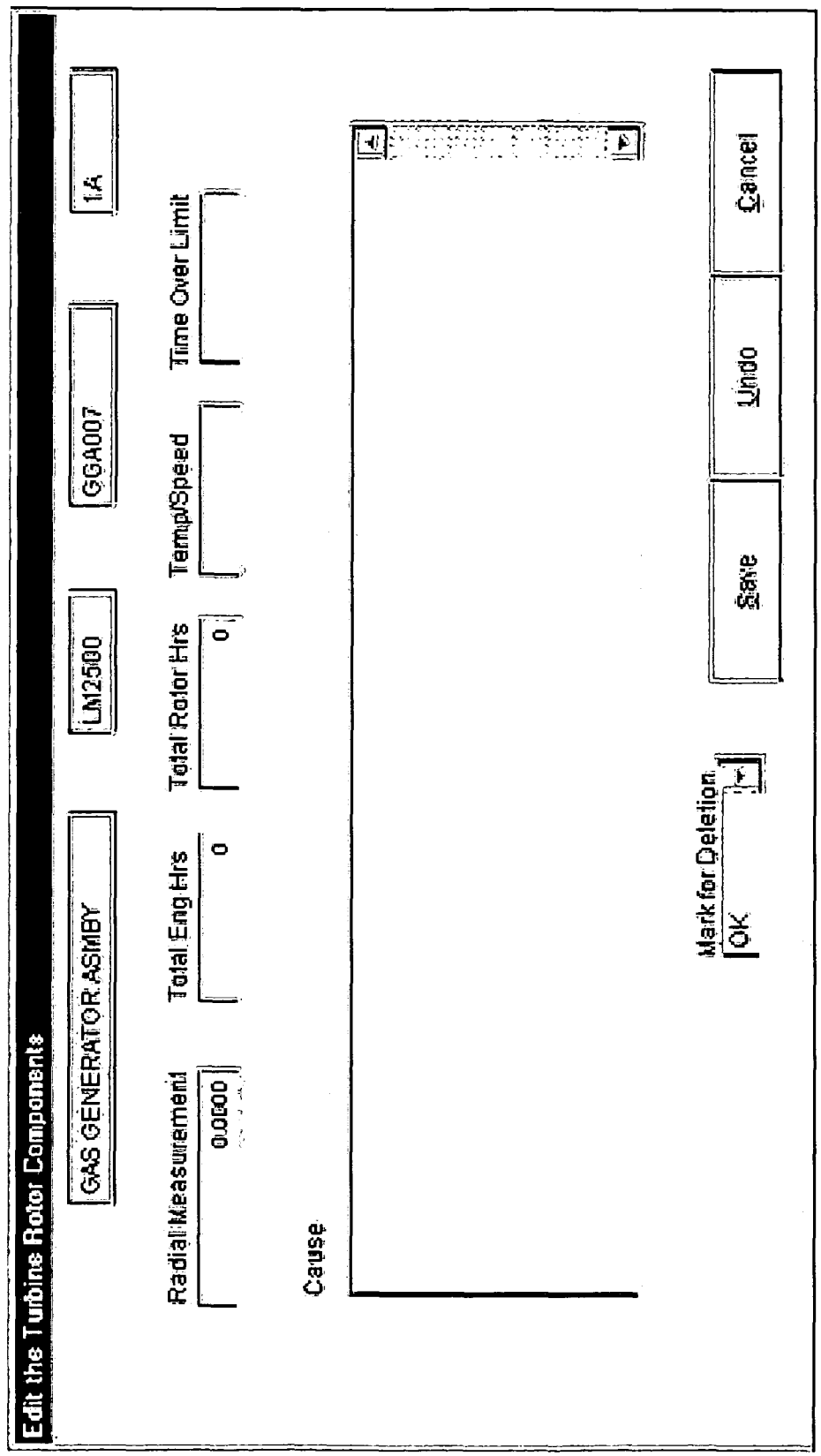
FIG. 18 is a pictorial representation, similar to that described by FIG. 1, of an inventive AUTOLOG program embodiment's Edit the Abnormal Temp Data form.

With reference to FIG. 18, Adding and Editing Abnormal Temp Data is done using the "Edit the Abnormal Temp Data" form. The form has six text boxes for data entry, labeled "Radial Measurement," "Total Eng Hrs," "Total Rotor Hrs," "TempSpeed," "Time Over Limit" and "Cause," which update to the diameter, aenghrs, arhrs, atemps, atimeo and acause fields, respectively, in the comptp7da table.

There are three buttons on the form, labeled "Add," "Undo" and "Cancel." Clicking on the "Save" button executes code that updates changes to the fields on the form to the comptp7da table, and the form closes. Clicking on the "Undo" button executes code that resets the form to its original state and refreshes the form. Clicking on the "Cancel" button sets the form to its original state and closes the form.

5.2.11. Add/Edit Hours and Starts Form

Figure 19:
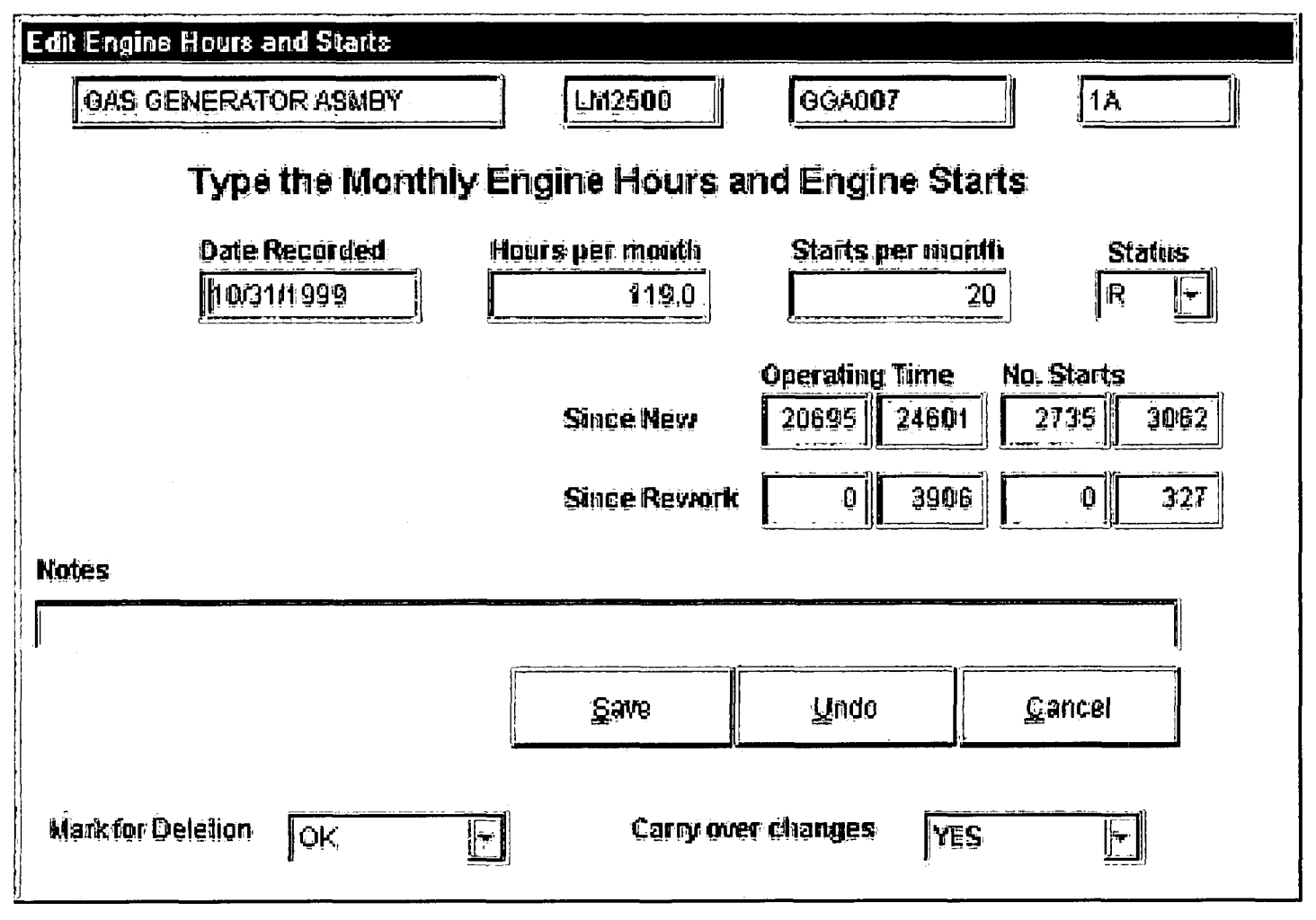

With reference to FIG. 19, Adding and Editing an Hours and Starts record is done using the "Edit Engine Hours and Starts" form. It has four text boxes for data entry, labeled "Date Recorded," "Hours per month," "Starts per month" and "Notes." They update to the yophours_dt, hrs_mo, strt_mo and notes fields, respectively, in the eng_ophours table.

Additionally, there is a grid of text fields representing operating time and number of starts, for since new and since rework. It is basically a two-row by two-column grid where each column consists of two text boxes per row, one for data entry and one which is a calculated read-only field (For example, there is a data entry text box and a read-only text box in the "Operating Time" column of the "Since New" row). The data entry text boxes in the "Since New" row update to the tempsnhrs and tempsnstrt fields of the eng_ophours table, and the data entry text boxes in the "Since Rework" row update to the temprwhrs and temprestrt fields of the eng_ophours table, respectively for the "Operating Time" and "No. Starts" columns. The read-only text boxes in the grid are obtained from the corresponding read-only fields on the Ophours Tabular section of the Module or Engine data entry form (See 5.1.1. Operating Log Tab Section).

The form has three buttons, labeled "Add," "Undo" and "Cancel." Clicking on the "Save" button executes code that checks for a valid "Date Recorded" and for values greater than zero for "Hours per month," "Starts per month," "Operating Time/Since New," "No. Starts/Since New," "Operating Time/Since Rework" and "No. Starts/Since Rework." If any of these checks fail, the user is notified that he/she must enter valid data for the respective field. If the checks all pass, changes to the fields on the form are updated to the eng_ophours table, and the form closes. Clicking on the "Undo" button executes code that resets the form to its original state and refreshes the form. Clicking on the "Cancel" button sets the form to its original state and closes the form. More detail is given hereinbelow.

5.2.11.1. Operational Hours

While adding monthly values for operational hours, some of the data the user enters could be carried over to engine(s) satisfying the following criteria. Firstly, it is required that the engine be in the same position. Secondly, it is required that the engine have an associated CI.

Clicking on the "Save" button executes the pertinent code. Associated CIs are standard and are assigned to the variables by using an "IF" statement. The list of associated CIs is set forth in Table 5, below.

TABLE 5

| Associated CIs | |
| --- | --- |
| CI | Cascading to CI |
| GPM | CTM |
| | IHM |
| CTM | GPM |
| | IHM |
| IHM | CTM |
| | GPM |
| GGA | PTA |
| PTA | GGA |
| GTA | HOT |
| HOT | GTA |

A code example is presented in FIG. 19a. Two procedures called from the code example shown in FIG. 19a are shown in FIG. 19b.

5.2.11.1.1. Adding Operational Hours

The user input engine "Status" is not carried over to the associated companion assembly. However, this value still needs to be set. To do so, the application finds the latest (by date) record for which the engine has a status code and copies it to the newly added record. In cases where no previous record can be found or all previous records were test records (status is "T"), status in a new record gets set to "N" (New) as a default. According to the present invention's AUTOLOG, this part is effected in a manner such as shown in FIG. 19c.

5.2.11.1.2. Modifying Operational Hours

Associated engines are found by the same rule as in Adding (I). Matching a particular record for modification on each of these engines is effected by matching Date Recorded, monthly value for hours and starts (If the record which has the same data on the associated engine does not exist, then no changes will be made). When the user opens the hours form for modification, Date Recorded, Hours Per Month, and Starts Per Month are assigned to variables (Init( ) procedure of enghoure.scx form):

oldhrs=eng_ophours.hrs_mo
oldstrts=eng_ophours.strt_mo
olddt=eng_ophours.yophours_dt Even if the user could modify those values, "old" values might be needed if user would like to carry over changes to associated engine to match a particular record in order to update it with new values. This is performed in an edit related( ) procedure by running a query:

sele ophours_re from eng_ophours;
where loc_type=m.myloc.and.yophours_dt=olddt.and.;
hrs_mo=oldhrs.and.strtmo=oldstrts.and.substr(ciasn,1,3)= addto_ci into array c Variables used in this query are described above. The variable ophours_re is a column containing the key to the record that would be used in order to update a particular record. If the query generates no results, then no records will be updated.

Other embodiments of the present invention will be apparent to those skilled in the art from a consideration of this specification or practice of the invention disclosed herein. Various omissions, modifications and changes to the principles described herein may be made by one skilled in the art without departing from the true scope and spirit of the present invention, which is indicated by the following claims.

What is claimed is:

1. An automated logging system for machinery onboard a ship, said machinery including plural machines, the automated logging system comprising a host computer not onboard a ship and at least one local computer onboard the ship, each said local computer including an interface for a user and being connected to said host computer and having resident in memory a computer program product including a computer useable medium having computer program logic recorded thereon, said computer program logic being embodied in computer code for enabling the corresponding said local computer to perform record keeping pertaining to said machinery, said record keeping including maintaining and updating of plural logbooks, said maintaining and updating including editing of existing logbooks, addition of new logbooks, and deletion of existing logbooks, each said logbook pertaining to a said machine and having associated therewith at least six relational database tables, said relational database tables pertaining to at least six categories, each said relational database table pertaining to at least one said category, said categories including maintenance, repair, logistics, inspection, operation, and miscellaneous history, a first said relational database table pertaining to at least maintenance, a second said relational database table pertaining to at least repair, a third said relational database table pertaining to at least logistics, a fourth said relational database table pertaining to at least inspection, a fifth said relational database table pertaining to at least operation, a sixth said relational database table pertaining to at least miscellaneous history, said relational database tables being components of a relational database on said local computer, said host computer having a master database, each said relational database table being relationally linked to at least one said relational database table pertaining to at least one different said category, said enabling of performance of record keeping including enabling of the corresponding said local computer to display plural interactive forms via said interface, each said interactive form facilitating performance of updating of information by said user of at least one update operation among the set of update operations including:

addition of information to at least one said relational database table;
deletion of information from at least one said relational database table;
addition of at least one said relational database table;
deletion of at least one said relational database table;
insertion of alpha-numeric textual information in narrative format in at least one narrative text field;
importation of information in a replacement file from said host computer to the corresponding said local computer, said importation of information in said replacement file including transmission of update information from a directory of said master database on said host computer to a said logbook on said local computer so as to write over and re-index information previously existing in said logbook, the information in said replacement file thereby replacing the information previously existing in said logbook;
readying of information in an update file for exportation from the corresponding said local computer to said host computer, said exportation of information in said update file including transmission of update information from a said logbook on said local computer to a directory of said master database on said host computer, said exportation including extracting, into a specified format, all update information of said at least one relational database table, the timing of said extracting of update information being performed based on at least one date of at least one of the previous update of information and the previous exportation of information.

2. The automated logging system of claim 1, wherein information that is updated in a logbook to which a first said machine pertains automatically carries over to the corresponding logbook of each of at least a second said machine that is similar to said first machine in said machinery.

3. The automated logging system of claim 1, wherein information that is updated in a said logbook to which a first said machine pertains automatically carries over to the corresponding said logbook of a second said machine that is mechanically associated with said first machine in said machinery.

4. The automated logging system of claim 3, wherein information that is updated in a said logbook to which a first said machine pertains automatically carries over to the corresponding said logbook of each of at least a second said machine that is similar to said first machine in said machinery.

5. The automated logging system of claim 4, wherein at least some said machines that each pertain to a said logbook are engines.

6. A computer program product for residence in memory of each of at least one local computer onboard a ship, each said local computer including an interface for a user and being connected to a host computer not onboard a ship, said computer program product comprising a computer useable medium having computer program logic recorded thereon, said computer program logic being embodied in computer code for enabling the corresponding said local computer to perform record keeping pertaining to machinery onboard the ship, said machinery including plural machines, said record keeping including maintaining and updating of plural logbooks, said maintaining and updating including editing of existing logbooks, addition of new logbooks, and deletion of existing logbooks, each said logbook pertaining to a said machine and having associated therewith at least six relational database tables, said relational database tables pertaining to at least six categories, each said relational database table pertaining to at least one said category, said categories including maintenance, repair, logistics, inspection, operation, and miscellaneous history, a first said relational database table pertaining to at least maintenance, a second said relational database table pertaining to at least repair, a third said relational database table pertaining to at least logistics, a fourth said relational database table pertaining to at least inspection, a fifth said relational database table pertaining to at least operation, a sixth said relational database table pertaining to at least miscellaneous history, said relational database tables being components of a relational database on said local computer, said host computer having a master database, each said relational database table being relationally linked to at least one said relational database table pertaining to at least one different said category, said enabling of performance of record keeping including enabling of the corresponding said local computer to display plural interactive forms via said interface, each said interactive form facilitating performance by said user of at least one update operation among the set of update operations including:

- addition of information to at least one said relational database table;
- deletion of information from at least one said relational database table;
- addition of at least one said relational database table;
- deletion of at least one said relational database table;
- insertion of alpha-numeric textual information in narrative format in at least one narrative text field;
- importation of information in a replacement file from said host computer to the corresponding said local computer, said importation of information in said replacement file including transmission of update information from a directory of said master database on said host computer to a said logbook on said local computer so as to write over and re-index information previously existing in said logbook, the information in said replacement file thereby replacing the information previously existing in said logbook; and
- readying of information in an update file for exportation from the corresponding said local computer to said host computer, said exportation of information in said update file including transmission of update information from a said logbook on said local computer to a directory of said master database on said host computer, said exportation including extracting, into a specified format, all update information of said at least one relational database table, the timing of said extracting of update information being performed based on at least one date of at least one of the previous update of information and the previous exportation of information.

7. The computer program product of claim 6, wherein information that is updated in a logbook to which a first said machine pertains automatically carries over to the corresponding logbook of each of at least a second said machine that is similar to said first machine in said machinery.

8. The computer program product of claim 6, wherein information that is updated in a said logbook to which a first said machine pertains automatically carries over to the corresponding said logbook of a second said machine that is mechanically associated with said first machine in said machinery.

9. The computer program product of claim 8, wherein information that is updated in a said logbook to which a first said machine pertains automatically carries over to the corresponding said logbook of each of at least a second said machine that is similar to said first machine in said machinery.

10. The computer program product of claim 9, wherein at least some said machines that each pertain to a said logbook are engines.

11. A computer program product for residence in memory of a computer situated onboard a ship and communicating with a server not situated onboard the ship and having an external database, said computer including an interface for a user, said computer program product comprising a computer useable medium having computer program logic recorded thereon, said computer program logic being embodied in computer code for enabling said computer to perform record keeping pertaining to machinery onboard the ship, said machinery including plural machines, said record keeping including maintaining and updating of plural logbooks, said maintaining and updating including editing of existing logbooks, addition of new logbooks, and deletion of existing logbooks, each said logbook pertaining to a said machine and having associated therewith at least six relational database tables, said relational database tables pertaining to at least six categories, each said relational database table pertaining to at least one said category, said categories including maintenance, repair, logistics, inspection, operation, and miscellaneous history, a first said relational database table pertaining to at least maintenance, a second said relational database table pertaining to at least repair, a third said relational database table pertaining to at least logistics, a fourth said relational database table pertaining to at least inspection, a fifth said relational database table pertaining to at least operation, a sixth said relational database table pertaining to at least miscellaneous history, said relational database tables being components of a relational database, each said relational database table being relationally linked to at least one said relational database table pertaining to at least one different said category, said enabling of performance of record keeping including enabling of said computer to display plural interactive forms via said interface, each said interactive form facilitating performance of updating of information by said user of at least one update operation among the set of update operations including:

- addition of information to at least one said relational database table;
- deletion of information from at least one said relational database table;
- addition of at least one said relational database table;
- deletion of at least one said relational database table;
- insertion of alpha-numeric textual information in narrative format in at least one narrative text field;
- importation of information in a replacement file from said external database to said computer, said importation of information in said replacement file including transmission of update information from a directory of said external database to a said logbook on said computer so as to write over and re-index information previously existing in said logbook, the information in said replacement file thereby replacing the information previously existing in said logbook; and
- readying of information for exportation from said computer to said external database, said exportation of information in said update file including transmission of update information from a said logbook on said local computer to a directory of said external database on said server, said exportation including extracting, into a specified format, all update information of said at least one relational database table, the timing of said extracting of update information being performed based on at least one date of at least one of the previous update of information and the previous exportation of information.

12. The computer program product of claim 11, wherein said importation of information is effected by at least one of File Transfer Protocol, electronic mail and compact disk.

13. The computer program product of claim 11, wherein said exportation of information is effected by at least one of File Transfer Protocol, electronic mail and compact disk.

14. The computer program product of claim 11, wherein said importation of information and said exportation of information are effected by at least one of File Transfer Protocol, electronic mail and compact disk.

15. The computer program product of claim 11, wherein information that is updated in a logbook to which a first said machine pertains automatically carries over to the corresponding logbook of each of at least a second said machine that is similar to said first machine in said machinery.

16. The computer program product of claim 11, wherein information that is updated in a said logbook to which a first said machine pertains automatically carries over to the corresponding said logbook of a second said machine that is mechanically associated with said first machine in said machinery.

17. The computer program product of claim 16, wherein information that is updated in a said logbook to which a first said machine pertains automatically carries over to the corresponding said logbook of each of at least a second said machine that is similar to said first machine in said machinery.

18. The computer program product of claim 17, wherein at least some said machines that each pertain to a said logbook are engines.

* * * * *